US007623873B2

(12) United States Patent
Satrusajang et al.

(10) Patent No.: US 7,623,873 B2
(45) Date of Patent: Nov. 24, 2009

(54) METHOD FOR CONTROLLING COMMUNICATION, METHOD FOR CONTROLLING TERMINAL, COMMUNICATION CONTROL DEVICE, GATEWAY TERMINAL, AND MOBILE TERMINAL

(75) Inventors: Ratapon Satrusajang, Kawasaki (JP); Masanori Morita, Tachikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 307 days.

(21) Appl. No.: 11/245,335

(22) Filed: Oct. 7, 2005

(65) Prior Publication Data

US 2006/0079229 A1    Apr. 13, 2006

(30) Foreign Application Priority Data

Oct. 13, 2004    (JP) .............................. 2004-299111

(51) Int. Cl.
    *H04W 24/00*    (2006.01)
    *H04W 4/00*    (2006.01)
(52) U.S. Cl. ................. 455/456.1; 455/41.1; 370/338
(58) Field of Classification Search ............ 455/41, 455/432, 435–444, 456.1–457, 433, 41.1–41.3; 370/338
    See application file for complete search history.

(56) References Cited

U.S. PATENT DOCUMENTS

| 6,304,556 | B1 * | 10/2001 | Haas | ........................ | 370/338 |
| 2002/0058504 | A1 * | 5/2002 | Stanforth | ..................... | 455/426 |
| 2002/0177451 | A1 * | 11/2002 | Ogasawara | ................. | 455/456 |
| 2003/0027574 | A1 * | 2/2003 | Watanabe et al. | ........... | 455/435 |

FOREIGN PATENT DOCUMENTS

WO    WO 03/024144 A1    3/2003

OTHER PUBLICATIONS

Kasera et al., "A Location Management Protocol for Hierarchically Organized Multihop Mobile Wireless Networks", Oct. 1997, pp. 158-162.*
MobileAd-hoc Networks (manet), IETF working group, retrieved Oct. 4, 2004.
MIPMANET-Mobile IP for Mobile Ad Hoc Networks, U. Johnson et al., IEEE MobiHOC, pp. 76-85, 2000.
Global Connectivity for Ipv6 Mobile Ad Hoc Networks, R. Wakikawa et al., Internet Draft, IETF, Nov. 2002.
Kasera et al., "A Location Management Protocol for Hierarchically Organized Multihop Mobile Wireless Networks," International Conference on Universal Personal Communications Record, San Diego, Oct. 12, 1997, vol. 2, Conf. 6, pp. 158-162.

(Continued)

*Primary Examiner*—Lester Kincaid
*Assistant Examiner*—Daniel Lai
(74) *Attorney, Agent, or Firm*—Crowell & Moring LLP

(57) ABSTRACT

The present invention reduces the number of location registration signals transmitted by slave terminals of gateway terminals forming ad hoc networks. Information on the current location of a gateway terminal is acquired. On the basis of the current location information acquired, a plurality of gateway terminals are grouped into a location registration area. Location registration area information indicative of the location registration area is transmitted to a mobile terminal mastered by the gateway terminal. The slave mobile terminal transmits a location registration signal only if the location registration area information has been changed. This makes it possible to reduce the number of location registration signals transmitted by the slave terminals compared to the case in which the gateway terminals are not grouped.

5 Claims, 20 Drawing Sheets

OTHER PUBLICATIONS

Beongku et al., "A Mobility-Based Clustering Approach to Support Mobility Management and Multicast Routing in Mobile Ad-Hoc Wireless Networks," International Journal of Network Management, Wiley, GB, Dec. 2001, pp. 387-395.

Jiang et al., "A Distributed Dynamic Regional Location Management Scheme for Mobile IP," The Conference on Computer Communications, 21$^{st}$ Annual Joint Conference of the IEEE Computer and Communication Societies, NY, Jun. 23, 2002, pp. 1069-1078.

European Search Report dated Feb. 14, 2006 (eleven (11) pages).

* cited by examiner

| GPS INFORMAITION | | LOCATION REGISTRATION AREA |
|---|---|---|
| LATITUDE | LONGITUDE | |
| X1~X2 | Y1~Y2 | A |
| X1~X2 | Y3~Y4 | B |
| X3~X4 | Y1~Y2 | C |
| X3~X4 | Y3~Y4 | D |

| GPS INFORMAITION | | LOCATION REGISTRATION AREA |
|---|---|---|
| LATITUDE | LONGITUDE | |
| X1~X4 | Y1~Y4 | W |

| GATEWAY TERMINAL | ADJACENT TERMINAL | LOCATION REGISTRATION AREA |
|---|---|---|
| Ga | Gb | A |
| Gb | Ga | |
| Gc | Gd | B |
| Gd | Gc | |
| Ge | Gf,Gg | |
| Gf | Ge,Gg | C |
| Gg | Ge,Gf,Gh,Gi | |
| Gh | Gg,Gi,Gj | D |
| Gi | Gg,Gh | C |
| Gj | Gh,Gk | D |
| Gk | Gj | |
| · | · | · |
| · | · | · |
| · | · | · |
| · | · | · |

METHOD FOR CONTROLLING COMMUNICATION, METHOD FOR CONTROLLING TERMINAL, COMMUNICATION CONTROL DEVICE, GATEWAY TERMINAL, AND MOBILE TERMINAL

BACKGROUND OF THE INVENTION

1. Field of the Invention

The present invention relates to a method for controlling communication, a method for controlling a terminal, a communication control device, a gateway terminal, and a mobile terminal, and in particular, to a method for controlling communication, a method for controlling a terminal, a communication control device, a gateway terminal, and a mobile terminal all of which are used in a mobile communication network having a core network and an ad hoc network integrated together.

2. Description of the Related Art

With a radio ad hoc network technique (see, for example, Chairs: Joseph Macker and Scott Corson, "Mobile Ad-hoc Networks (manet), IETF working group, (retrieved on Oct. 4, 2004), Internet<URL: http://www.ietf.org/html.charters/manet-charter.html>), each mobile terminal serves as a router to autonomously constitute a radio network without using a core network so that data can be transmitted and received via another mobile terminal. The radio ad hoc network does not require any core network and is thus helpful in temporarily constructing a network or taking measures for a disaster.

Instead of allowing each mobile terminal in the radio ad hoc network to communicate using another mobile terminal, other techniques allow the mobile terminal to connect to a global network via a core network or to communicate with another terminal via the core network (see, for example, U. Johnson et al., "MIPMANET-mobile IP for mobile ad hoc networks," IEEE MobiHOC, pp 76-85, 2000 and R. Wakikawa et al., "Global Connectivity for Ipv6 Mobile Ad Hoc Networks" (draft-wakikawa-manet-globalv6-02.txt), Internet Draft, IETF, November 2002). These techniques enable a mobile terminal to transmit a signal to a terminal in the core network, while enabling the terminal in the core network to transmit a signal to the mobile terminal. This can be accomplished when a mobile terminal having a specific address retrieves a node or terminal that serves as a gateway to the core network so that the node can provide a global address to the mobile terminal, which then registers the global address, that is, information on the current location, in a location managing device. The series of operations are called location registration. To transmit a signal, the mobile terminal can directly utilize the global address for communication.

On the other hand, to receive a signal, the terminal in the core network transmits data to the specific address of the mobile terminal. Then, the data is sent to the location managing device, which manages locational information on the mobile terminal. The location managing device changes a header of the data to the global address of the mobile terminal. The location managing device then transfers the data to the mobile terminal. Since mobile terminals and gateway terminals are moved, the mobile terminal executes location registration again when it cannot communicate with the gateway terminal having provided the address to the mobile terminal or when finding a more appropriate gateway terminal.

However, with the above conventional techniques, when the mobile terminal or the gateway terminal is frequently moved, there disadvantageously occurs an increase in the number of signals (referred to as "location registration signals" below) transmitted which allow the registration of data indicating which gateway terminal masters the mobile terminal. This problem will be described with reference to FIG. 23. As shown in this figure, gateway terminals G1 to G4 are present within reach of an electric wave from a base station device BS provided to construct a cellular network cnet. An ad hoc network is formed of the gateway terminals G1 to G4 and mobile terminals (referred to as slave terminals below) mastered by the respective gateway terminals G1 to G4. The ad hoc network is connected to the cellular network cnet, which can be connected to the Internet inet.

Each of the gateway terminals G1 to G4, present within reach of an electric wave from the base station device BS, has a function for cellular communication. Each of the gateway terminals G1 to G4 stores its terminal ID in an HLR (Home Location Register; not shown) in the cellular network cnet in association with its cellular location registration area information. Thus, if there is an incoming message for any of the gateway terminals, the contents stored in the HLR are referenced. The incoming message is then sent to the relevant base station device. Further, the base station device sends the incoming message to the gateway terminal.

On the other hand, the slave terminals do not have the function for cellular communication. Consequently, the slave terminals cannot be connected directly to the cellular network cnet or to the Internet inet. Thus, each of the slave terminals connects to the cellular network cnet via the gateway terminal forming an ad hoc network together with the slave terminal. The connection via the gateway terminal enables the slave terminal to connect to the cellular network cnet and to the Internet inet. This also applies to slave terminals which have the cellular function but which are located beyond reach of an electric wave from the base station device BS; these slave terminals can be connected to both cellular network cnet and Internet inet via the gateway terminal.

The terminal ID of each mobile terminal is stored in an HA (HomeAgent) 10 connected to the Internet inet in association with the location registration area information on the mobile terminal. If there is an incoming message for any of the slave terminals, the contents stored in the HA 10 are referenced. The incoming message is then-sent to the relevant base station device. Further, the base station device sends the incoming message to the gateway terminal. Then, the gateway terminal transmits the incoming message to the slave terminal (as shown by a broken arrow in the figure). When the terminal ID of each slave terminal is always stored in the HA 10 in association with the location registration area information on the mobile terminal, incoming message processing can be executed on the slave terminal regardless of which gateway terminal forms an ad hoc network together with the slave terminal.

The terminal ID of the slave terminal may be stored in the HLR instead of the HA in association with the location registration area information on the slave terminal. Then, if there is an incoming message based on speech communication for the slave terminal, referencing the contents stored in the HLR allows the base station device to transmit the incoming message to the gateway terminal mastering the slave terminal. Then, by transmitting the incoming message from the gateway terminal to the slave terminal, it is possible to execute incoming message processing on speech communication via the gateway terminal.

In this case, when the mobile terminal M moves, it sequentially crosses the location registration areas. Every time the mobile terminal M crosses the location registration area, it transmits a location registration signal to the HA 10 via the gateway terminal (as shown by a solid arrow in the figure).

The location registration area is narrower than the reach of an electric wave from the base station device BS. This increases the number of location registration signals transmitted.

The present invention is made to solve the above problems of the prior art. It is an object of the present invention to provide a method for controlling communication, a method for controlling a terminal, a communication control device, a gateway terminal, and a mobile terminal all of which can reduce the number of location registration signals transmitted by the slave terminals of the gateway terminals.

SUMMARY OF THE INVENTION

According to claim 1 of the present invention, there is provided a method for controlling communication in a communication system in which each mobile terminal forms an ad hoc network together with a corresponding gateway terminal and in which if a location registration area is changed, the mobile terminal transmits a location registration signal, the method being characterized by comprising a locational information acquiring step of acquiring a current location of the gateway terminal, a locational information transmitting step of transmitting the locational information acquired in the locational information acquiring step, a location registration area information acquiring step of acquiring location registration area information indicative of a location registration area of the gateway terminal on the basis of the locational information transmitted in the locational information transmitting step, and a location registration area information transmitting step of transmitting the location registration area information acquired in the location registration area information acquiring step, to the mobile terminal. The number of location registration signals transmitted by the slave terminals can be reduced by acquiring the location registration area information corresponding to the information on the current location of the gateway terminal and transmitting the location registration area information acquired to the slave terminal.

According to claim 2 of the present invention, the method for controlling communication in a communication system in which each mobile terminal forms an ad hoc network together with a corresponding gateway terminal and in which if a location registration area is changed, the mobile terminal transmits a location registration signal, the method being characterized by comprising a retrieving step of retrieving an adjacent gateway terminal, a grouping step of grouping the gateway terminal and others on the basis of a result of the retrieval in the retrieving step, and a location registration area information transmitting step of transmitting the group formed in the grouping step to the mobile terminal as location registration area information. By combining a plurality of gateway terminals into one group constituting one location registration area, it is possible to freely set the size of the location registration area and to reduce the number of location registration signals transmitted by slave terminals.

According to claim 3 of the present invention, there is provided a method for controlling a gateway terminal that forms an ad hoc network together with a mobile terminal that transmits a location registration signal if a location registration area is changed, the method comprising a locational information acquiring step of acquiring information on a current location of the gateway terminal, a locational information transmitting step of transmitting the locational information acquired in the locational information acquiring step, a location registration area information receiving step of receiving location registration area information corresponding to the locational information transmitted in the locational information transmitting step, and a location registration area information transmitting step of transmitting the location registration area information received in the location registration area information receiving step, to the mobile terminal. The number of location registration signals transmitted by slave terminals can be reduced by acquiring the location registration area information corresponding to the information on the current location of the gateway terminal and transmitting the location registration area information acquired to the slave terminal.

According to claim 4 of the present invention, the method for controlling a gateway terminal that forms an ad hoc network together with a mobile terminal that transmits a location registration signal if a location registration area is changed, the method comprising a retrieving step of retrieving an adjacent gateway terminal, an adjacent terminal information transmitting step of transmitting information on the adjacent terminal that is a result of the retrieval in the retrieving step, a location registration area information receiving step of receiving location registration area information corresponding to a group of gateway terminals formed on the basis of the adjacent terminal information transmitted in the adjacent terminal information transmitting step, and a location registration area information transmitting step of transmitting the location registration area information received in the location registration area information receiving step, to the mobile terminal. By combining a plurality of gateway terminals into one group constituting one location registration area, it is possible to freely set the size of the location registration area and to reduce the number of location registration signals transmitted by slave terminals.

According to claim 5 of the present invention, there is provided a communication control device that masters each gateway terminal that forms an ad hoc network together with a corresponding mobile terminal that transmits a location registration signal if a location registration area is changed, the location registration area being obtained by dividing an area covered by the same base station device into N pieces (N is a natural number), the communication control device being characterized by comprising locational information acquiring means for acquiring locational information on the gateway terminal from the gateway terminal, and location registration area information transmitting means for transmitting location registration area information corresponding to the locational information acquired by the locational information acquiring means, to the gateway terminal. The number of location registration signals transmitted by slave terminals can be reduced by acquiring the location registration area information corresponding to the information on the current location of the gateway terminal and transmitting the location registration area information acquired to the slave terminal.

According to the present invention, the communication control device that masters each gateway terminal that forms an ad hoc network together with a corresponding mobile terminal that transmits a location registration signal if a location registration area is changed, the location registration area being obtained by dividing an area covered by the same base station device into N pieces (N is a natural number), the communication control device being characterized by comprising adjacent terminal information acquiring means for acquiring, from the gateway terminal, a result of retrieval of an adjacent gateway terminal, location registration area determining means for grouping the gateway terminal and others with reference to the result of the retrieval acquired by the adjacent terminal information acquiring means and assigning a location registration area to each group, and location registration area information transmitting means for transmitting location registration area information indicative of the location registration area assigned by the location registration area determining means, to the gateway terminal. By combining a plurality of gateway terminals into one group constituting one location registration area, it is possible to freely set the size of the location registration area and to reduce the number of location registration signals transmitted by slave terminals.

According to the present invention, there is provided a gateway terminal that forms an ad hoc network by mastering a mobile terminal that transmits a location registration signal if a location registration area is changed, the gateway terminal transmitting current location registration area information to the mobile terminal, the gateway terminal comprising locational information acquiring means for acquiring information on a current location of the gateway terminal, location registration area information acquiring means for acquiring location registration area information indicative of a location registration area of the gateway terminal on the basis of the locational information acquired by the locational information acquiring means, and location registration area information transmitting means for transmitting the location registration area information acquired by the location registration area information acquiring means, to the slave mobile terminal. The number of location registration signals transmitted by slave terminals can be reduced by acquiring the location registration area information corresponding to the information on the current location of the gateway terminal and transmitting the location registration area information acquired to the slave terminal.

According to of the present invention, the gateway terminal set forth is characterized in that the location registration area information acquiring means has a table showing correspondences between the locational information and the location registration area information, and the location registration area information is acquired with reference to the table. Referencing the table allows the location registration area information to be easily acquired.

According to the present invention, the gateway terminal that forms an ad hoc network by mastering a mobile terminal that transmits a location registration signal if a location registration area is changed, the gateway terminal transmitting current location registration area information to the mobile terminal, the gateway terminal comprising adjacent terminal retrieving means for retrieving another gateway terminal adjacent to the above described gateway terminal, a location registration area information receiving means for receiving location registration area information indicative of a location registration area assigned to the group including the above described gateway terminal and the adjacent gateway terminal and formed with reference to a result of the retrieval executed by the adjacent terminal retrieving means, and location registration area information transmitting means for transmitting the location registration area information received by the location registration area information receiving means, to the slave mobile terminal. By combining a plurality of gateway terminals into one group constituting one location registration area, it is possible to freely set the size of the location registration area and to reduce the number of location registration signals transmitted by slave terminals.

According to the present invention, there is provided a mobile terminal comprising location registration area information acquiring means for acquiring current location registration area information from a gateway terminal which forms an ad hoc network together with the mobile terminal and which belongs to a corresponding group, comparing means for comparing the current location registration area information acquired from the location registration area information acquiring means with location registration area information stored in the mobile terminal, and location registration signal transmitting means for transmitting a location registration signal only if the comparison made by the comparing means does not show that contents of the current location registration area information acquired from the location registration area information acquiring means match those of the location registration area information stored in the mobile terminal. The above configuration of the mobile terminal makes it possible to reduce the number of location registration signals transmitted.

According to the present invention, there is provided a method for controlling a mobile terminal forming an ad hoc network together with a corresponding gateway terminal, the method comprising a location registration area information acquiring step of acquiring current location registration area information from a gateway terminal which forms an ad hoc network together with the mobile terminal and which belongs to a corresponding group, a comparing step of comparing the current location registration area information acquired from the location registration area information acquiring step with location registration area information stored in the mobile terminal, and a location registration signal transmitting step of transmitting a location registration signal only if the comparison in the comparing step does not show that contents of the current location registration area information acquired from the location registration area information acquiring means match those of the location registration area information stored in the mobile terminal. The above control of the mobile terminal makes it possible to reduce the number of location registration signals transmitted.

As described above, the present invention produces the effect described below if a terminal mastered by a gateway terminal forming an ad hoc network is connected to another network. By combining a plurality of gateway terminals into one group constituting one location registration area, it is possible to freely set the size of the location registration area and to reduce the number of location registration signals transmitted by slave terminals.

BRIEF DESCRIPTION OF THE DRAWINGS

FIGS. 6A to 6C are diagrams showing an example of the configuration of a location registration area correspondence table, wherein FIG. 6A is a diagram showing an example of the locational relationship between location registration areas and GPS information obtained through a GPS, FIG. 6B is a diagram showing an example of the contents of a location registration area correspondence table, and FIG. 6C is a diagram showing a location registration area into which four location registration areas are combined;

DETAILED DESCRIPTION OF THE PREFERRED EMBODIMENTS

Figure 1:
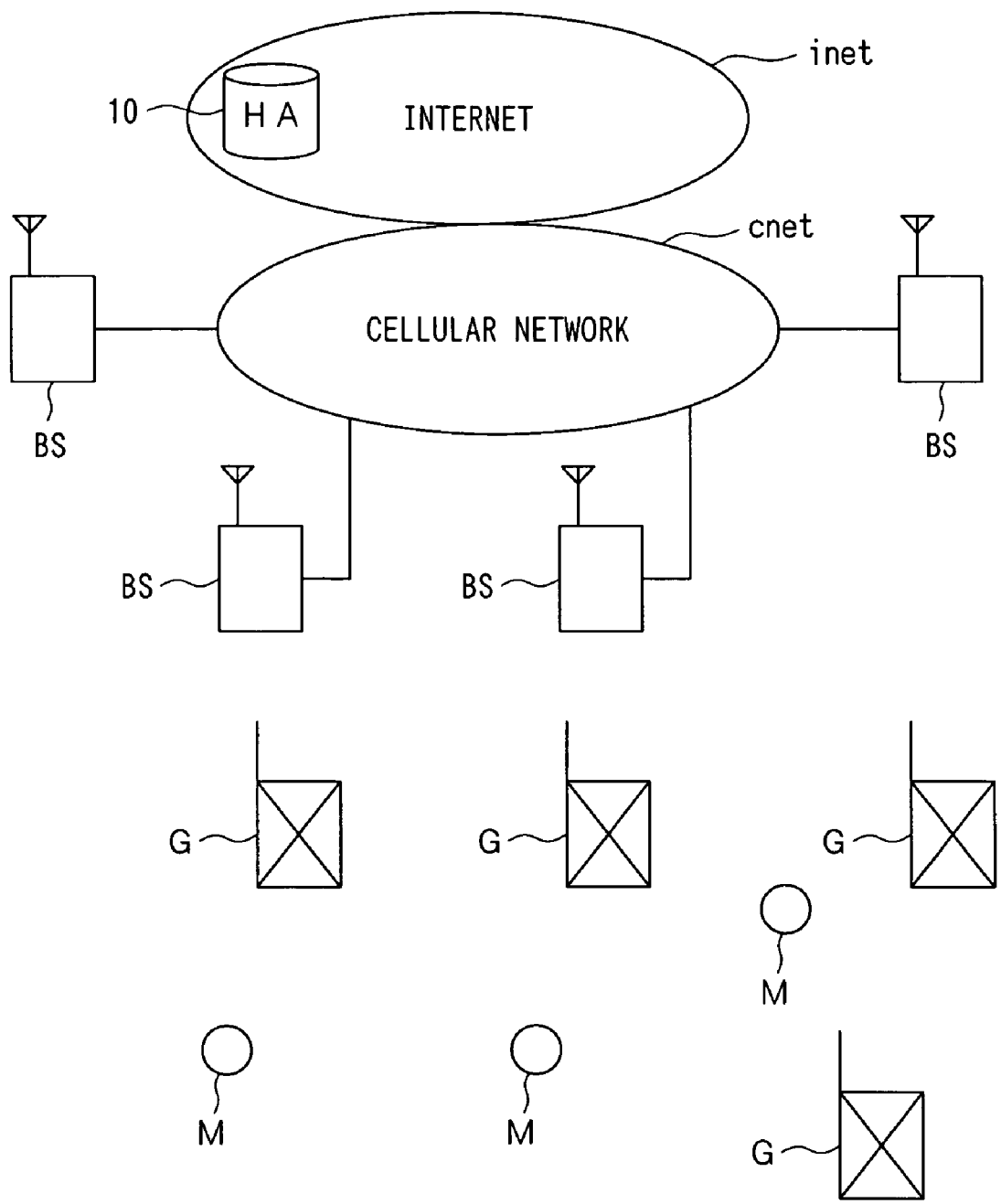
FIG. 1 is a diagram showing an example of the configuration of a mobile communication system implemented using a gateway terminal, a mobile terminal, and a base station device in accordance with the present invention.

Embodiments of the present invention will be described below with reference to the drawings. In the figures referenced in the description below, components equivalent to those in other figures have the same reference numerals.

FIG. 1 is a diagram showing an example of the configuration of a mobile communication system implemented by a gateway terminal, a mobile terminal, and a communication control device in accordance with the present invention. In the figure, the Internet inet is provided with an HA 10 that stores the terminal ID of each mobile terminal in association with its location registration area information.

The cellular network cnet is a well-known mobile communication and is connected to the Internet inet via a gateway device or the like (not shown) to serve as a core network. The cellular network cnet is provided with a large number of base station devices BS each of which is an example of a communication control device. A cellular communication function is provided for gateway terminals G present within reach of an electric wave from each of the base station device BS so that the gateway terminals G can communicate with the base station device BS by radio.

A mobile terminal M has only a short-distance radio communication function, for example, well-known Bluetooth (registered trademark). Since such a terminal does not have a cellular communication function, the mobile terminal M cannot be independently connected directly to the cellular network cnet. Further, examples of the mobile terminal M include terminals having a cellular function but located beyond reach of an electric wave from the base station device BS.

Thus, provided that a mobile terminal not having the cellular communication function or located beyond reach of an electric wave from the base station device BS forms an ad hoc network together with a gateway terminal present near the mobile terminal, the mobile terminal can be connected to the cellular network cnet and to the Internet inet via the gateway terminal. One or more mobile terminals may be form an ad hoc network together with a gateway terminal.

That is, in the ad hoc network, the cellular network cnet can connect, via gateway terminals, to not only mobile terminals that can communicate directly with the gateway terminal (that is, over one hop) but also those which can communicate with the gateway terminal via another mobile terminal (that is, over at least two hops). These gateway terminals can also be connected to the Internet inet.

Two methods are available for forming an ad hoc network. In a first method, a mobile terminal transmits a gateway terminal search message to search for a gateway terminal around the mobile terminal. Upon receiving a reply to this message from a gateway terminal, the mobile terminal forms an ad hoc network together with the gateway terminal as a slave terminal.

In a second method, the gateway terminal periodically transmits a mobile terminal search message. Upon receiving this message, the mobile terminal transmits a reply message. The mobile terminal thus forms an ad hoc network together with the gateway terminal as a slave terminal.

The slave terminal forming the ad hoc terminal together with the gateway terminal receives and stores location registration area information from the gateway terminal. Upon receiving the current location registration area information, the slave terminal compares it with stored location registration area information. If a result of the comparison shows that the current location registration area information matches the stored location registration area information, the slave terminal does not output a location registration signal. The location registration signal is output only if the current location registration area information does not match the stored location registration area information. The location registration signal output by the slave terminal is sent to the HA 10 via the gateway terminal and then the base station device. In the HA 10, the terminal ID and the location registration area information are registered.

The slave mobile terminal transmits the location registration signal only if the location registration area information is changed. This makes it possible to reduce the number of location registration signals transmitted by slave terminals compared to the case in which gateway terminals are not grouped.

The present invention is characterized by the configuration of the communication control device such as the base station device, the gateway terminal, and the mobile terminal serving as a slave to the gateway terminal. In connection with this, a first to third embodiments will be described below.

First Embodiment

Figure 2:
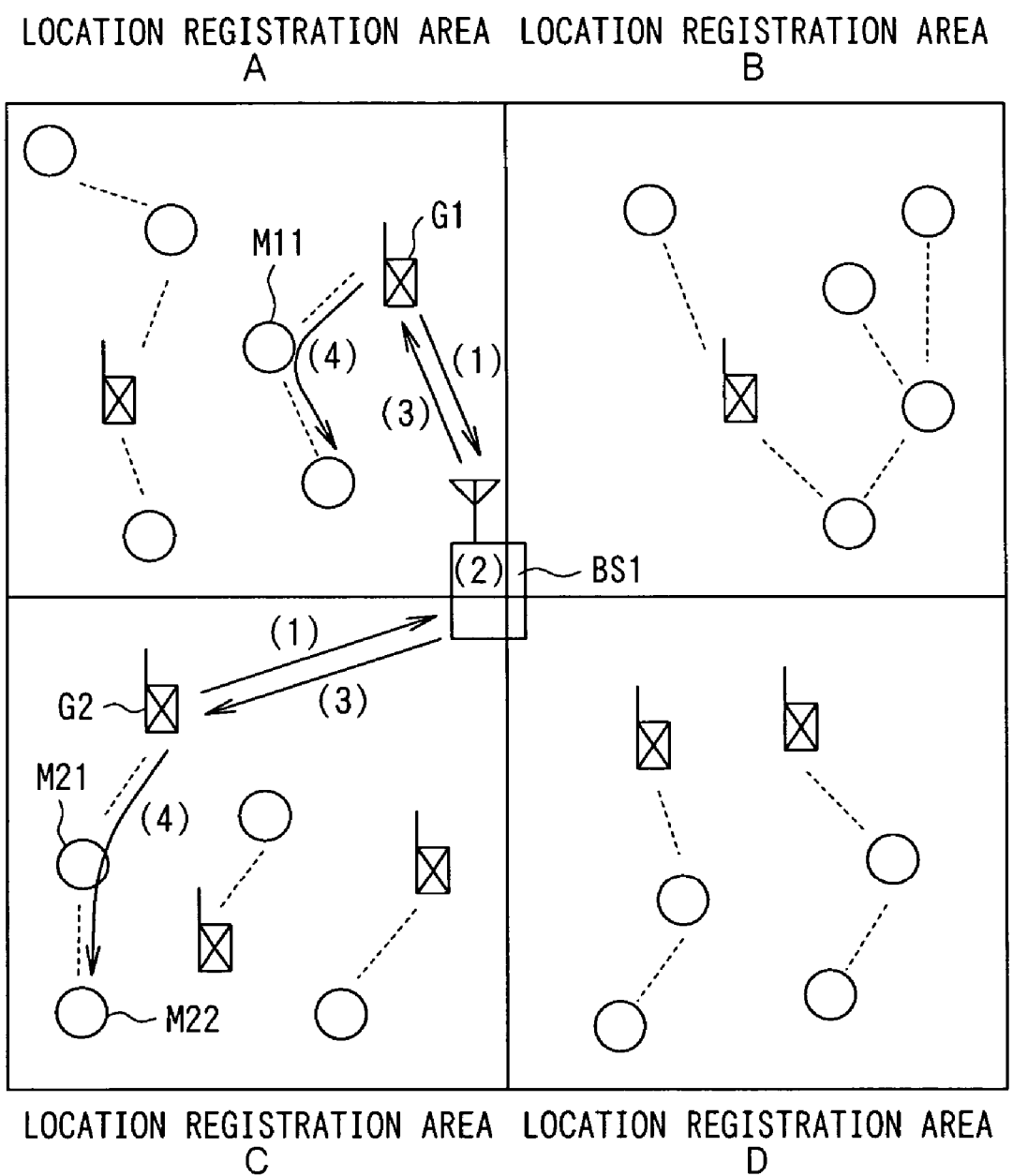
FIG. 2 is a diagram showing the configuration of a mobile communication system in accordance with a first embodiment of the present invention.

As seen in FIG. 2, the reach of an electric wave from the base station device BS1 is divided into four location registration areas A to D. Two gateway terminals are present in the location registration area A. One gateway terminal is present in the location registration area B. Three gateway terminals are present in the location registration area C. Two gateway terminals are present in the location registration area D.

Operations in accordance with the present embodiment will be described in brief.

(1) The gateway terminal transmits GPS information to the base station device. In this case, all the gateway terminals transmit GPS information regardless of the presence of a slave terminal or the size of the group.

(2) The base station device references a location registration area correspondence table on the basis of GPS information to determine the location registration area.

(3) The base station device notifies the gateway terminal of location registration area information. For example, the gateway terminal G1 is notified of location registration area information indicative of the "location registration area A". The gateway terminal G2 is notified of location registration area information indicative of the "location registration area C".

(4) The gateway terminal notifies its slave mobile terminal of the location registration area information as required.

Figure 3:
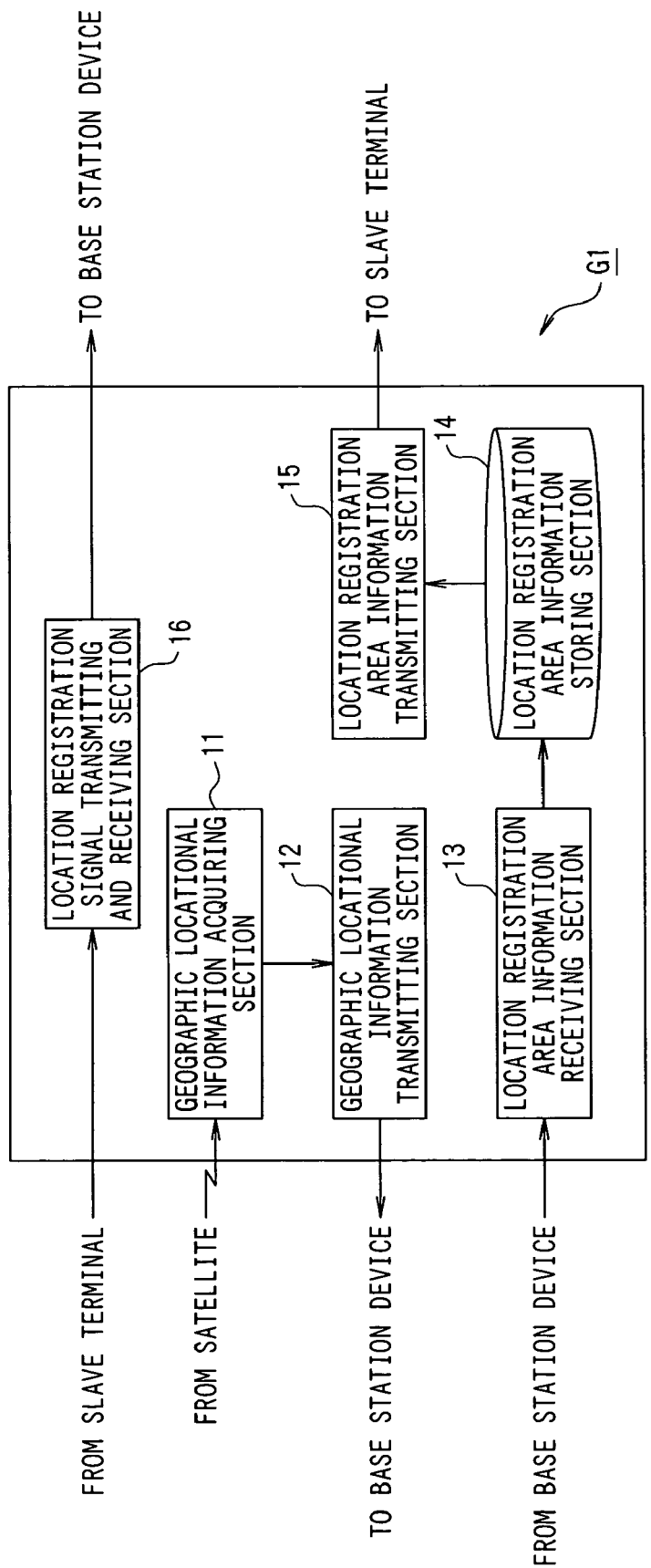
FIG. 3 is a diagram showing an example of the configuration of a gateway terminal in FIG. 2.
Figure 4:
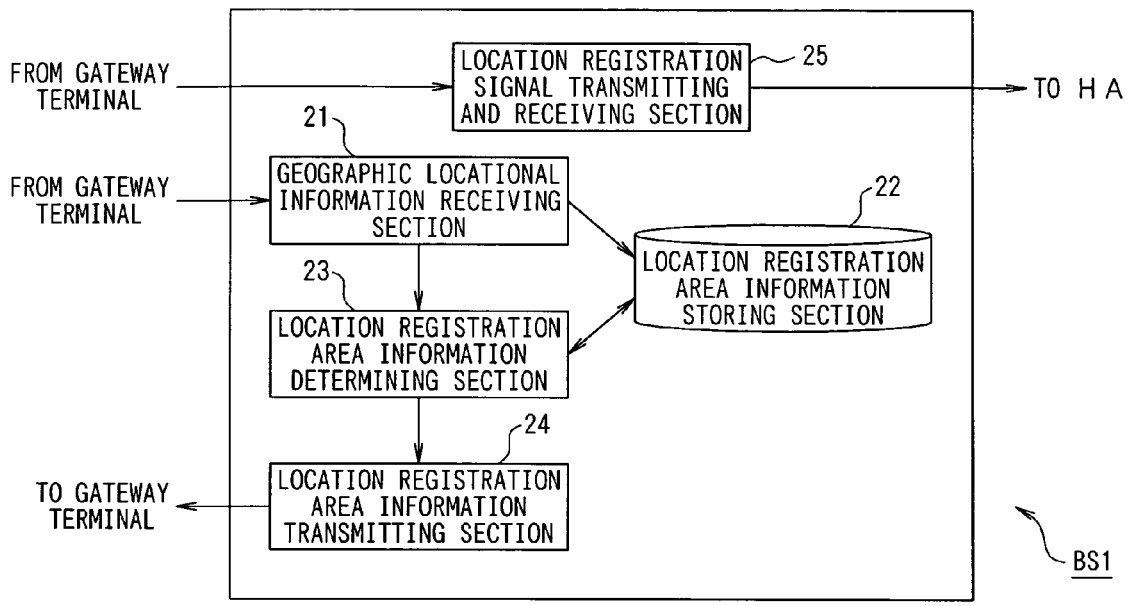
FIG. 4 is a diagram showing an example of the configuration of a base station device in FIG. 2.
Figure 5:
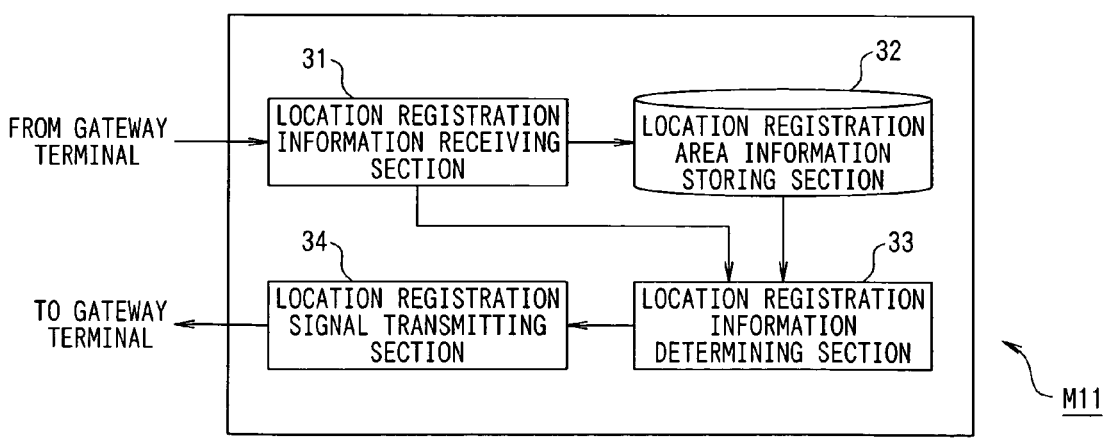
FIG. 5 is a diagram showing an example of the configuration of a slave terminal in FIG. 2.

With reference to FIGS. 3 to 5, description will be given of an example of the configuration of the gateway terminal, base station device, and mobile terminal which implements the above operations.

(Example of Configuration of Gateway Terminal)

As shown in FIG. 3, a gateway terminal G1 in a mobile communication system in accordance with the present embodiment includes a geographic locational information acquiring section 11 that acquires geographic locational information utilizing a well-known GPS (Global Positioning System), a geographic locational information transmitting section 12 that transmits the geographic locational information acquired by the geographic locational information acquiring section 11, to the base station device, a location registration area information receiving section 13 that receives the location registration area information transmitted by the base station device, a location registration area information storing section 14 that stores the location registration area information received by the location registration area information receiving section 13, a location registration area information transmitting section 15 that transmits the location registration area information stored in the location registration area information storing section 14, and a location registration signal transmitting and receiving section 16 which receives and transmits a location registration signal transmitted by the slave terminal to the base station device. The other gateway terminals in FIG. 2 have a similar configuration.

(Example of Configuration of Base Station Device)

As shown in FIG. 4, a base station device BS1 in the mobile communication system in accordance with the present embodiment includes a geographic locational information receiving section 21 that receives geographic locational information from the gateway terminal, a location registration area correspondence information storing section 22 that stores a location registration area correspondence table containing information on the correspondence between the geographic locational information and the location registration area, a location registration area determining section 23 that references the location registration area correspondence table stored in the location registration area correspondence information storing section 22 to acquire the location registration area information corresponding to the geographic locational information received from the gateway terminal, a location registration area information transmitting section 24 that transmits the location registration area information acquired by the location registration area determining section 23, to the gateway terminal, and a location registration signal transmitting and receiving section 25 that receives and transmits the location registration signal transmitted by the gateway terminal, to the HA 10.

The location registration area correspondence table stored in the location registration area correspondence information storing section 22 may have fixed contents or contents that can be updated by an arbitrary device within the network. The latter case makes it possible to deal with a change in the size of the location registration area or in the number of divisions.

(Example of Configuration of Mobile Terminal)

Now, with reference to FIG. 5, description will be given of an example of the configuration of the mobile terminal in FIG. 2, that is, the slave terminal M11. As shown in FIG. 5, the slave terminal M11 includes a location registration information storing section 31 that receives location registration information from the gateway terminal, a location registration information storing section 32 that stores the location registration information received by the location registration information receiving section 31, a location registration information determining section 33 that compares the location registration information stored in the location registration information storing section 32 with the location registration information newly received by the location registration information receiving section 31 to determine whether the location registration area is changed, and a location registration signal transmitting section 34 that transmits the location registration signal to the gateway terminal if the location registration information determining section 33 determines the location registration area is changed. The other slave terminals in FIG. 2 have a similar configuration.

In the slave terminal configured as described above, when the location registration information receiving section 31 receives the current location registration area information, the location registration information determining section 33 compares the current location registration area information with the location registration area information stored in the location registration information storing section 32. If the result of the comparison shows that the current location registration area information matches the stored location registration area information, the salve terminal determines that the location registration area has not been changed and the location registration signal transmitting section 33 does not transmit the location registration signal. On the other hand, if the result of the comparison does not show that the current location registration area information matches the stored location registration area information, the salve terminal determines that the location registration area has been changed and the location registration signal transmitting section 34 transmits the location registration signal. The transmitted location registration signal is transmitted to the HA 10 via the gateway terminal and then the base station device. The location registration signal is then stored in the HA 10.

(Location Registration Area Correspondence Table)

Figures 6A, 6B, 6C:
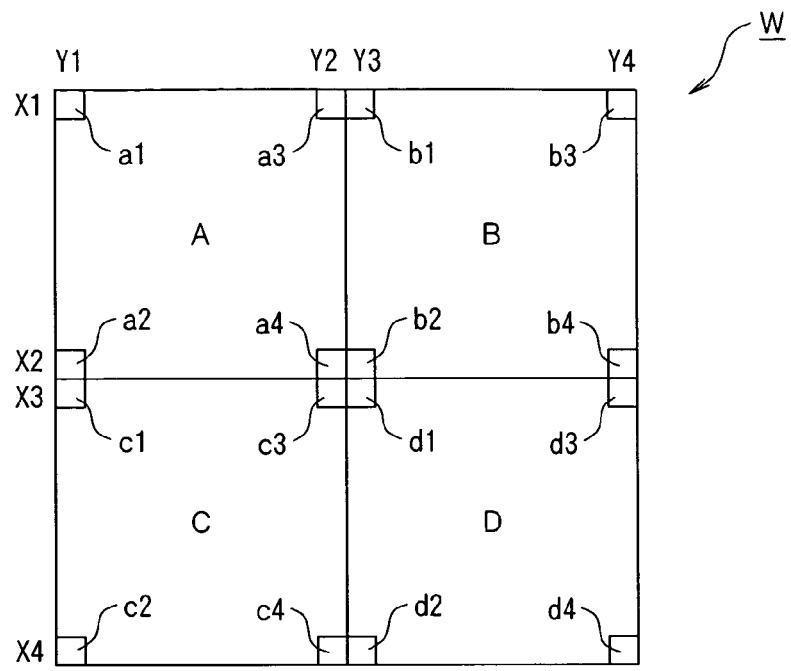

With reference to FIGS. 6A to 6C, description will be given of the contents of the location registration area correspondence table stored in the location registration area correspondence information storing section 22. FIG. 6A is a diagram showing an example the locational relationship between the location registration area and GPS information that is coordinate values for latitude (X) and longitude (Y). As seen in FIG. 6A, the four corners of the location registration area A are denoted as a1, a2, a3, and a4. The four corners of the location registration area B are denoted as b1, b2, b3, and b4. The four corners of the location registration area C are denoted as c1, c2, c3, and c4. The four corners of the location registration area D are denoted as d1, d2, d3, and d4. Each corner is represented by latitude and longitude, for example, as described below.

That is, the corner a1 is at (X1, Y1). The corner a2 is at (X2, Y1). The corner a3 is at (X1, Y2). The corner a4 is at (X2, Y2). The corner b1 is at (X1, Y3). The corner b2 is at (X2, Y3). The corner b3 is at (X1, Y4). The corner b4 is at (X2, Y4). The corner c1 is at (X3, Y1). The corner c2 is at (X4, Y1). The corner c3 is at (X3, Y2). The corner c4 is at (X4, Y2). The corner d1 is at (X3, Y3). The corner d2 is at (X4, Y3). The corner d3 is at (X3, Y4). The corner d4 is at (X4, Y4).

FIG. 6B is a diagram showing an example of the contents of the location registration area correspondence table. As shown in this figure, the location registration area A corresponds to a latitude of X1 to X2 and a longitude of Y1 to Y2 in GPS information. The location registration area B corresponds to a latitude of X1 to X2 and a longitude of Y3 to Y4 in GPS information. The location registration area C corresponds to a latitude of X3 to X4 and a longitude of Y1 to Y2 in GPS information. The location registration area D corresponds to a latitude of X3 to X4 and a longitude of Y3 to Y4 in GPS information.

Thus, in the present example, the location registration area of the current location of the terminal can be determined with reference to the location registration area correspondence table shown in FIG. 6B, on the basis of the latitude and longitude information that is the current geographic locational information of the terminal obtained from GPS.

(Operation of Whole System)

Figure 7:
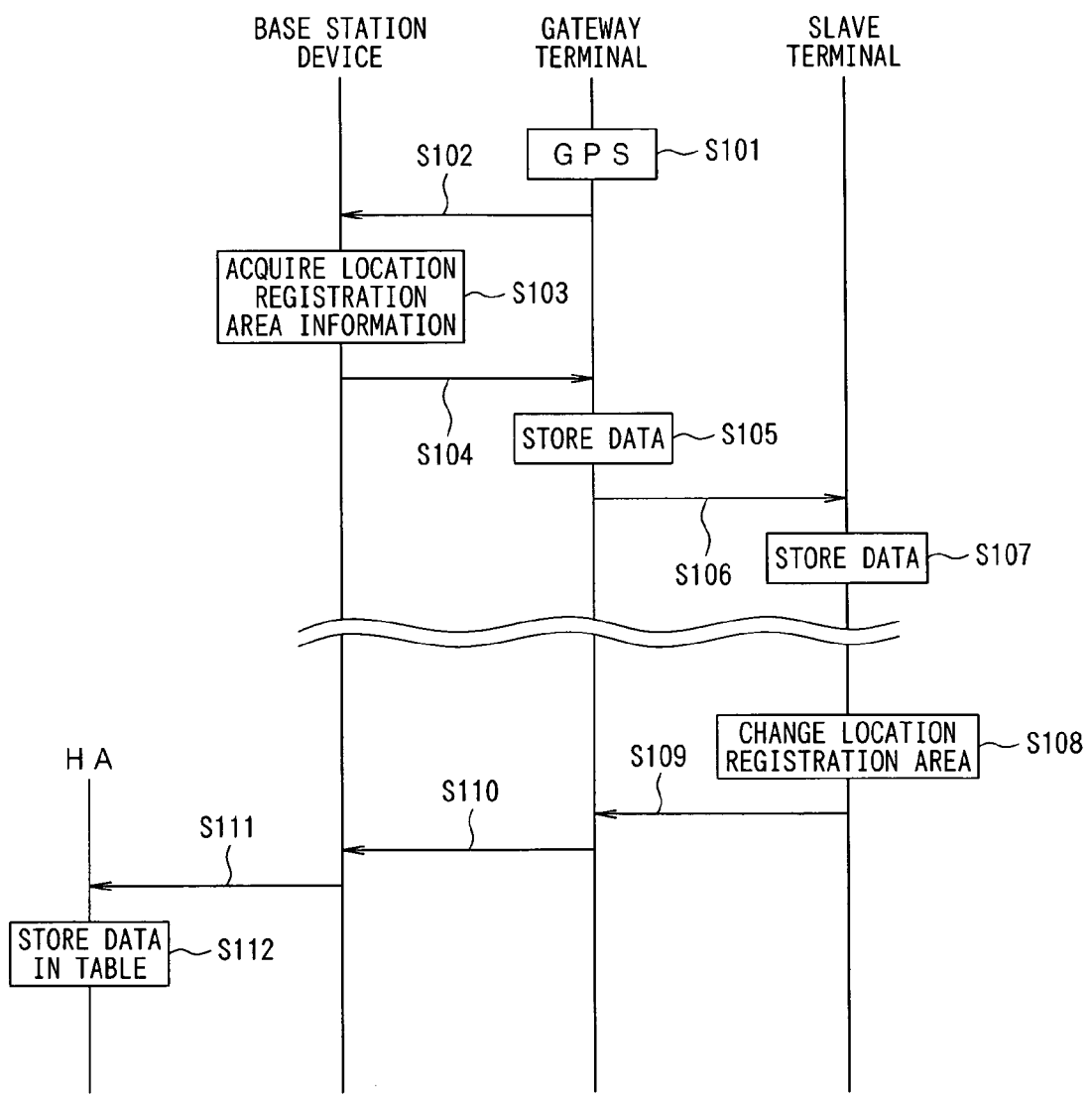
FIG. 7 is a sequence diagram showing operations of the mobile communication system in accordance with the first embodiment.

With reference to FIG. 7, description will be given of the above mobile communication system composed of the gateway terminal and base station device.

In this figure, the gateway terminal acquires the current GPS information (latitude and longitude) on itself through the GPS (S101). The gateway terminal then transmits locational information to the base station device (S102). Upon receiving the transmitted GPS information, the base station device references the location registration area correspondence table stored in the location registration area correspondence information storing section to acquire the location registration area information corresponding to the GPS information (S103). The base station device transmits the location registration area information acquired to the gateway terminal (S104).

Upon receiving the transmitted location registration information, the gateway terminal stores the location registration information in the location registration area information storing section (S105). The location registration area information stored in the location registration area information storing section is transmitted to the slave terminal as required (S106). For example, in response to a request from the slave terminal, the gateway terminal transmits the location registration area information stored in the location registration area information storing section.

Alternatively, the gateway terminal may periodically (for example, at intervals of several tens of seconds to several minutes) broadcast the location registration area information regardless of whether or not the slave device makes a request. Alternatively, the gateway terminal may broadcast the location registration area information periodically and upon a request from the slave terminal the gateway terminal may transmit the location registration area information.

Upon reception of the location registration area information transmitted by the gateway terminal, the slave terminal stores the information in the location registration area information storing section (S107).

The slave terminal compares the location registration area information stored in the location registration area information storing section with the received location registration area information. The slave terminal thus determines whether or not the location registration area has been changed.

Upon determining that the location registration area has been changed (S108), the slave terminal transmits a location registration signal to the gateway terminal (S109). The location registration signal is transmitted to the base station device (S110) and finally to the HA (S111). The HA stores the ID of the slave terminal in the table in association with the location registration area information (S112). Thus, if there is an incoming message for any slave terminal, it is possible to determine which base station device the incoming message is to be transmitted, by referencing the contents registered in the table. This requires the incoming message to be transmitted only to the related base station device and not to the other base station devices. Moreover, the gateway terminals except those located in the target location registration area neglect the incoming message transmitted by the base station device. The gateway terminals located in the target location registration area transfer the message to their slave terminals.

Figure 23:
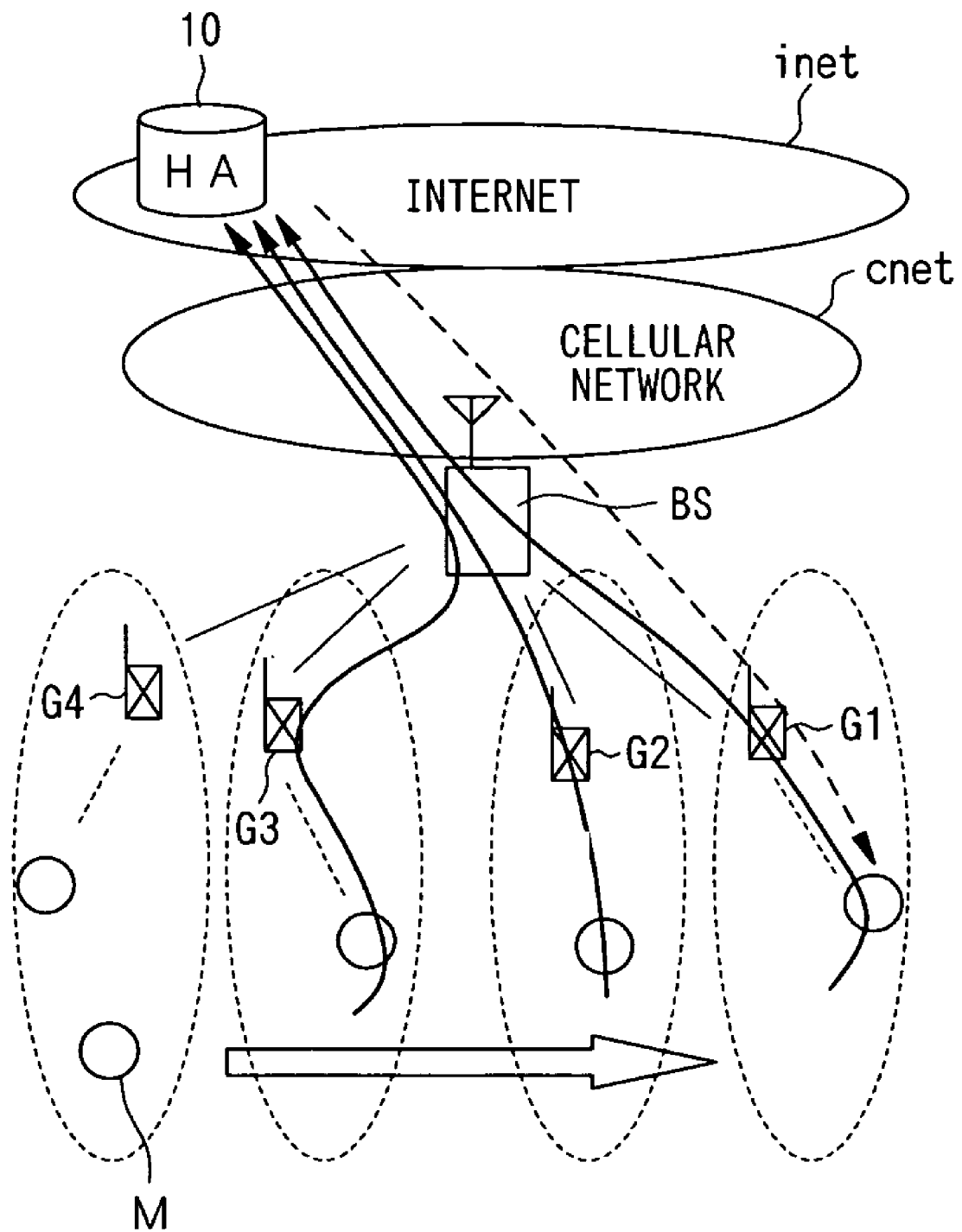
FIG. 23 is a diagram illustrating problems of the prior art.

As described above, in the prior art (FIG. 23), a change in a gateway terminal causes the corresponding slave terminal to output the location registration signal. In contrast, in the present system, in spite of a change in a gateway terminal, the following slave terminals do not output the location registration signal: the slave terminals of those gateway terminals which are members of to the same group to which the changed gateway terminal belongs. This makes it possible to reduce the number of location registration signals transmitted.

Second Embodiment

Figure 8:
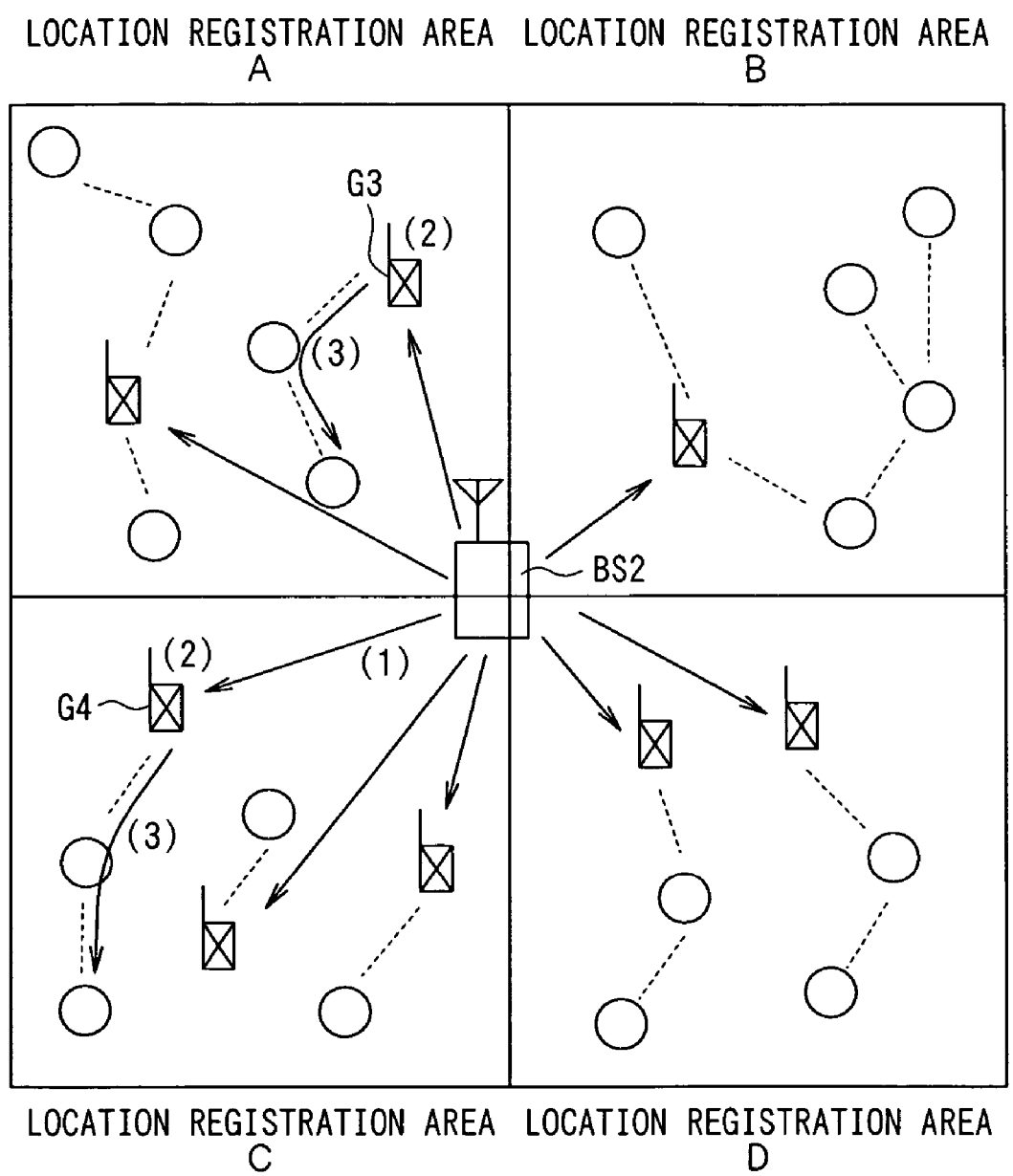
FIG. 8 is a diagram showing the configuration of a mobile communication system in accordance with a second embodiment of the present invention.

As seen in FIG. 8, the reach of an electric wave from the base station device BS2 is divided into the four location registration areas A to D as in the case of FIG. 2. In the first embodiment, described above, the base station device makes determination about the location registration area of the gateway terminal. In contrast, in the present embodiment, each gateway terminal makes this determination.

Operations in accordance with the present embodiment will be described below in brief.

(1) The base station device periodically reports the contents of the location registration area correspondence table to the gateway terminals in its cover area.

(2) The gateway terminal uses the location registration area correspondence table acquired to determine its own location registration area on the basis of the geographic location information acquired by it.

(3) The gateway terminal notifies its slave mobile terminal of the location registration area information as required.

Figure 9:
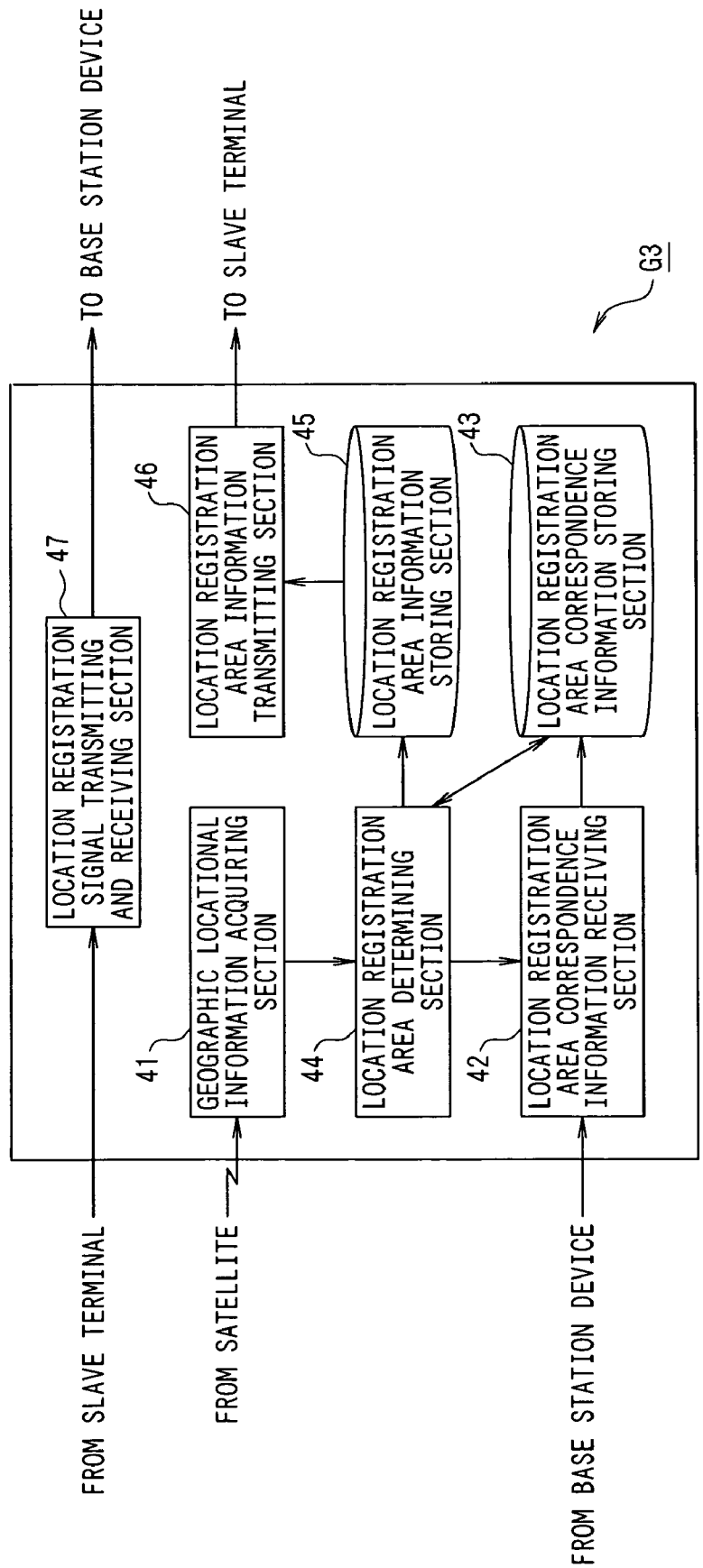
FIG. 9 is a diagram showing an example of the configuration of a gateway terminal in FIG. 3.
Figure 10:
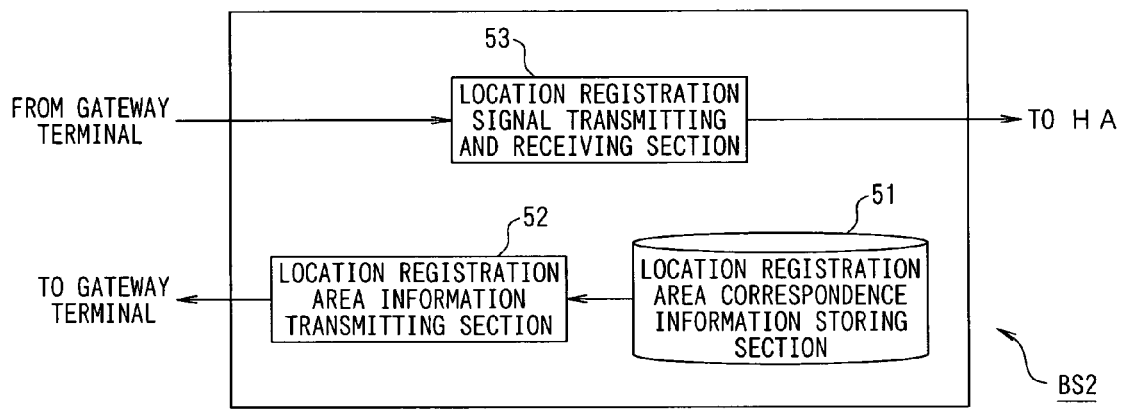
FIG. 10 is a diagram showing an example of the configuration of a base station device in FIG. 3.

With reference to FIGS. 9 and 10, description will be given of an example of the configuration of the gateway terminal and base station device which implements the above operations. The configuration of the mobile terminal in FIG. 8 is similar to those in the first embodiment. Accordingly, the description is omitted.

(Example of Configuration of Gateway Terminal)

As shown in FIG. 9, a gateway terminal G3 in a mobile communication system in accordance with the present embodiment includes a geographic locational information acquiring section 41 that acquires geographic locational information utilizing a well-known GPS (Global Positioning System), a location registration area correspondence information receiving section 42 that receives location registration area correspondence information relating the correspondence between the geographic locational information and the location registration area, from the base station device, a location registration area correspondence information storing section 43 that stores the location registration area correspondence information received from the base station device by the location registration area correspondence information receiving section 42, as a location registration area correspondence table, a location registration area determining section 44 that references the location registration area correspondence table stored in the location registration area correspondence information storing section 43 to determine the location registration area information corresponding to the graphical locational information acquired by the geographic locational information acquiring section 41, a location registration area information storing section 45 that stores the location registration area information resulting from the determination by the location registration area determining section 44, a location registration area information transmitting section 46 that transmits the location registration area information stored in the location registration area information storing section 45, and a location registration signal transmitting and receiving section 47 that receives and transmits a location registration signal transmitted by the slave terminal to the base station device. The contents of the location registration area correspondence table stored in the location registration area correspondence information storing section 43 are similar to those in the first embodiment, described above. Accordingly, their description is omitted.

The other gateway terminals in FIG. 8 have a configuration similar to that described above.

(Example of Configuration of Base Station Device)

As shown in FIG. 10, a base station device BS2 in the mobile communication system in accordance with the present embodiment includes a location registration area correspondence information storing section 51 that stores location registration area correspondence information on the correspondence between the geographic locational information and the location registration area, a location registration area information transmitting section 52 that transmits the location registration area correspondence information stored in the location registration area correspondence information storing section 51, to the gateway terminal, and a location registration signal transmitting and receiving section 53 that receives and transmits the location registration signal transmitted by the gateway terminal, to the HA 10.

The location registration area correspondence information stored in the location registration area correspondence information storing section 51 may have fixed contents or contents that can be updated by an arbitrary device within the network. The latter case makes it possible to deal with a change in the size of the location registration area or in the number of divisions.

(Operations of Whole System)

Figure 11:
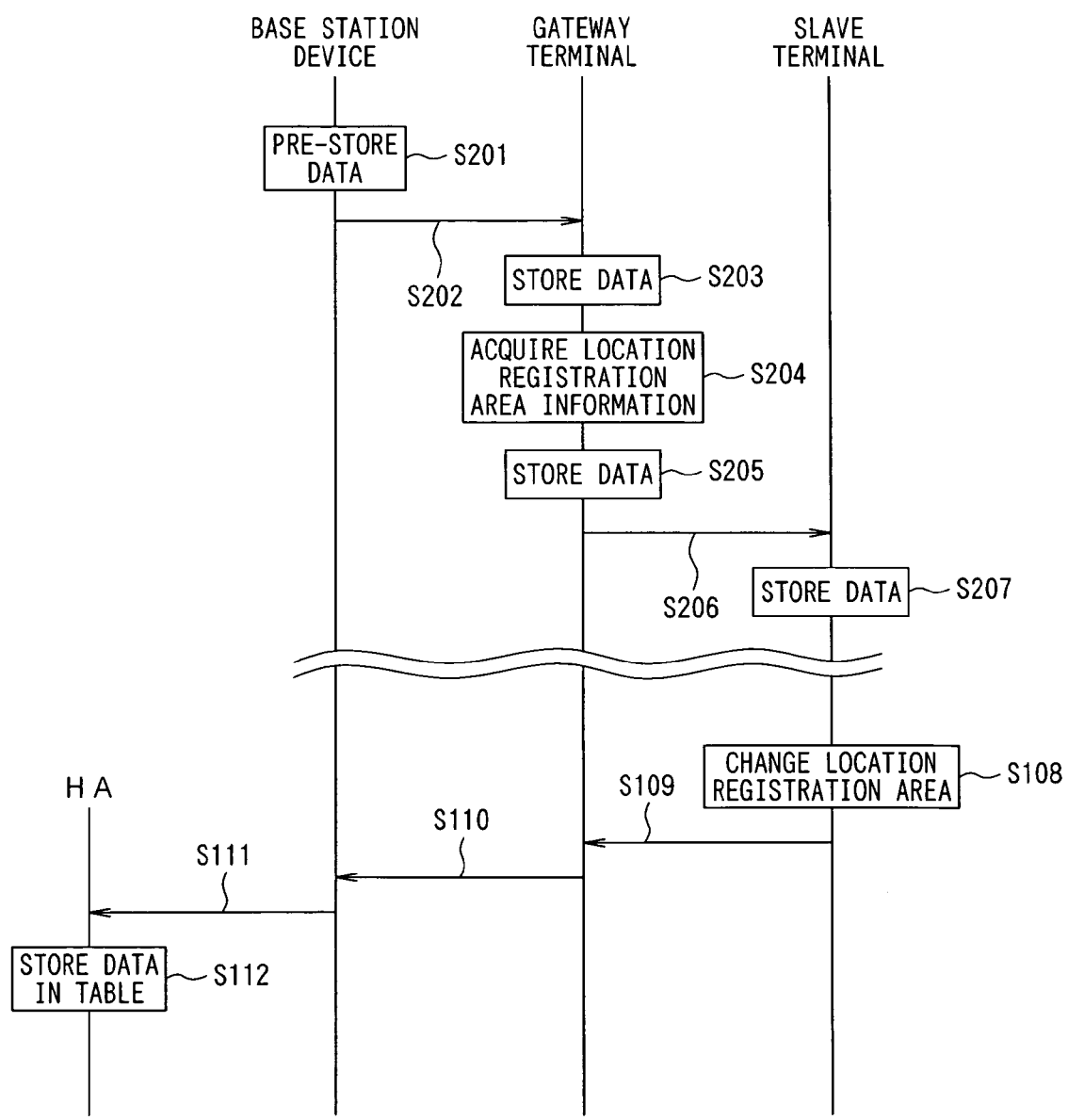
FIG. 11 is a sequence diagram showing operations of the mobile communication system in accordance with the second embodiment.

With reference to FIG. 11, description will be given of operations of the mobile communication system composed of the above gateway terminal, base station device, and the like.

In FIG. 11, the location registration area correspondence table is pre-stored in the location registration area correspondence information storing section of the base station device (S201). The base station device transmits the contents of the location registration area correspondence table stored in the location registration area correspondence information storing section, to the gateway terminal (S202). Upon receiving the contents of the location registration area correspondence table, the gateway terminal stores the contents in the location registration area correspondence information storing section (S203).

Upon acquiring the current GPS information (latitude and longitude) on itself through GPS, the gateway terminal references the location registration area correspondence table stored in the location registration area correspondence information storing section to acquire the location registration area information corresponding to the GPS information (S204). The gateway terminal stores the location registration information in the location registration area information storing section (S205). The location registration area information stored in the location registration area information storing section is transmitted to the slave terminal as required (S206). For example, in response to a request from the slave terminal, the gateway terminal transmits the location registration area information stored in the location registration area information storing section.

Alternatively, the gateway terminal may periodically (for example, at intervals of several tens of seconds to several minutes) broadcast the location registration area information regardless of whether or not the slave device makes a request. Alternatively, the gateway terminal may broadcast the location registration area information periodically and upon a request from the slave terminal the gateway terminal may transmit the location registration area information.

Upon reception of the location registration area information transmitted by the gateway terminal, the slave terminal stores the information in the location registration area information storing section (S207).

The slave terminal compares the location registration area information stored in the location registration area information storing section with the received location registration area information. The slave terminal thus determines whether or not the location registration area has been changed.

Upon determining that the location registration area has been changed (S108), the slave terminal transmits a location registration signal to the gateway terminal (S109). The subsequent operations are similar to those in the first embodiment (S110 to S112). Accordingly, their description is omitted.

In the first embodiment, described above, the base station device determines the location registration area. The base station device then transmits the result to the gateway terminal. In contrast, in the second embodiment, the gateway terminal internally determines the location registration area. This makes it possible to reduce the number of signals transmitted and received between the base station device and the gateway terminal compared to the first embodiment. However, in the second embodiment, a processing load inside the gateway terminal is heavier than that in the first embodiment.

Third Embodiment

In contrast to the first and second embodiments, described above, in the present embodiment, adjacent gateway terminals are grouped and treated as one location registration area without using any geographic locational information.

Figure 12:
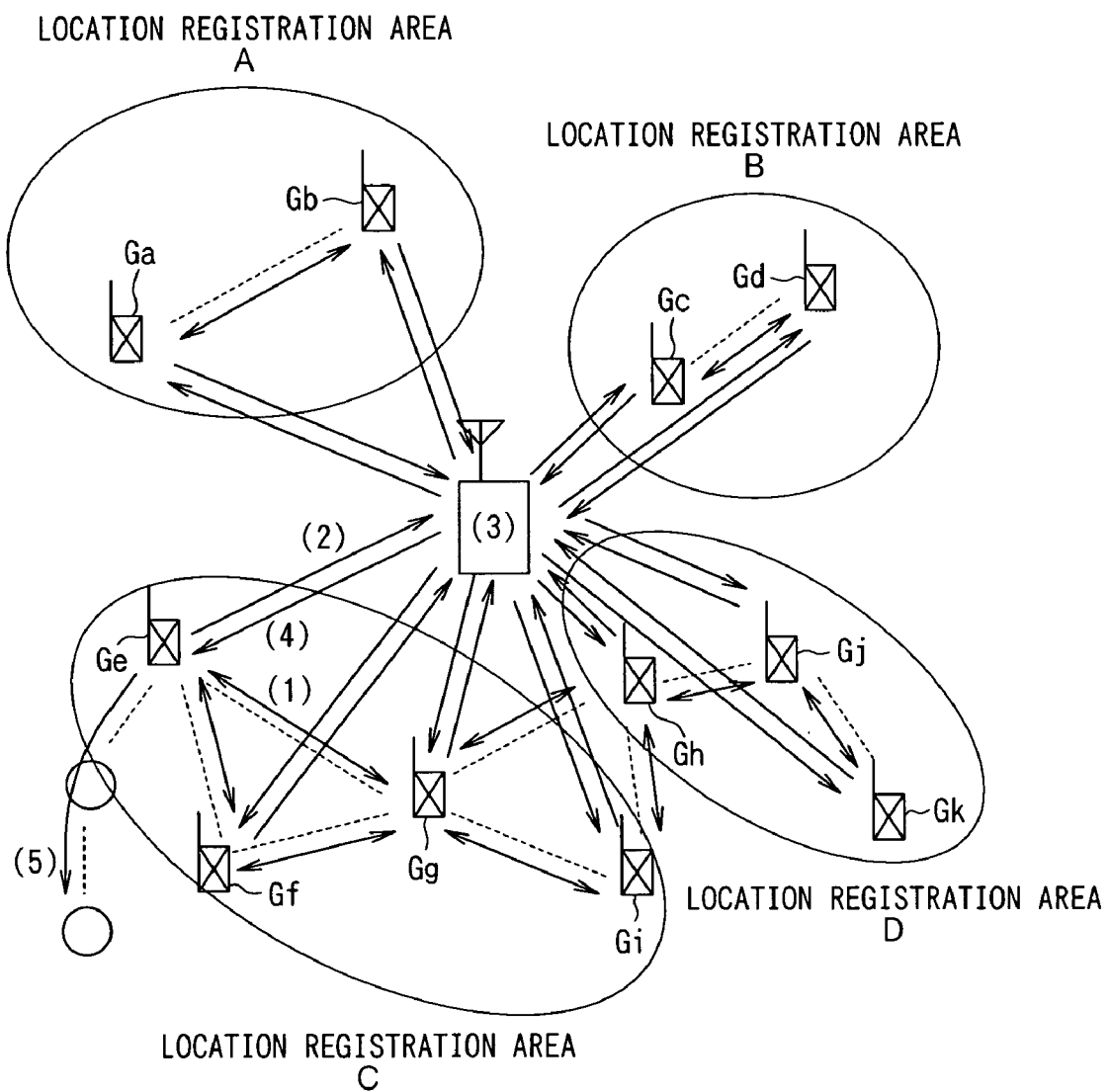
FIG. 12 is a diagram showing the configuration of a mobile communication system in accordance with a third embodiment of the present invention.

As seen in FIG. 12, gateway terminals Ga and Gb form the location registration area A. Gateway terminals Gc and Gd form the location registration area B. Gateway terminals Ge to Gg and Gi form the location registration area C. Gateway terminals Gh, Gj and Gk form the location registration area D.

Operations in accordance with the present embodiment will be described below in brief.

(1) The gateway terminal utilizes radio communication to search for an adjacent gateway terminal.

(2) Upon receiving a reply from the adjacent gateway terminal, the first gateway terminal notifies the base station device of the adjacent gateway terminal information.

(3) The base station device creates or updates an adjacent terminal information table on the basis of the first and adjacent gateway terminals. The base station device then groups the gateway terminals and assigns a location registration area to each group.

(4) The base station device transmits the location registration area information indicative of the assigned location registration area, to each gateway terminal.

(5) The gateway terminal notifies its slave mobile terminal of the location registration area information as required.

Figure 13:
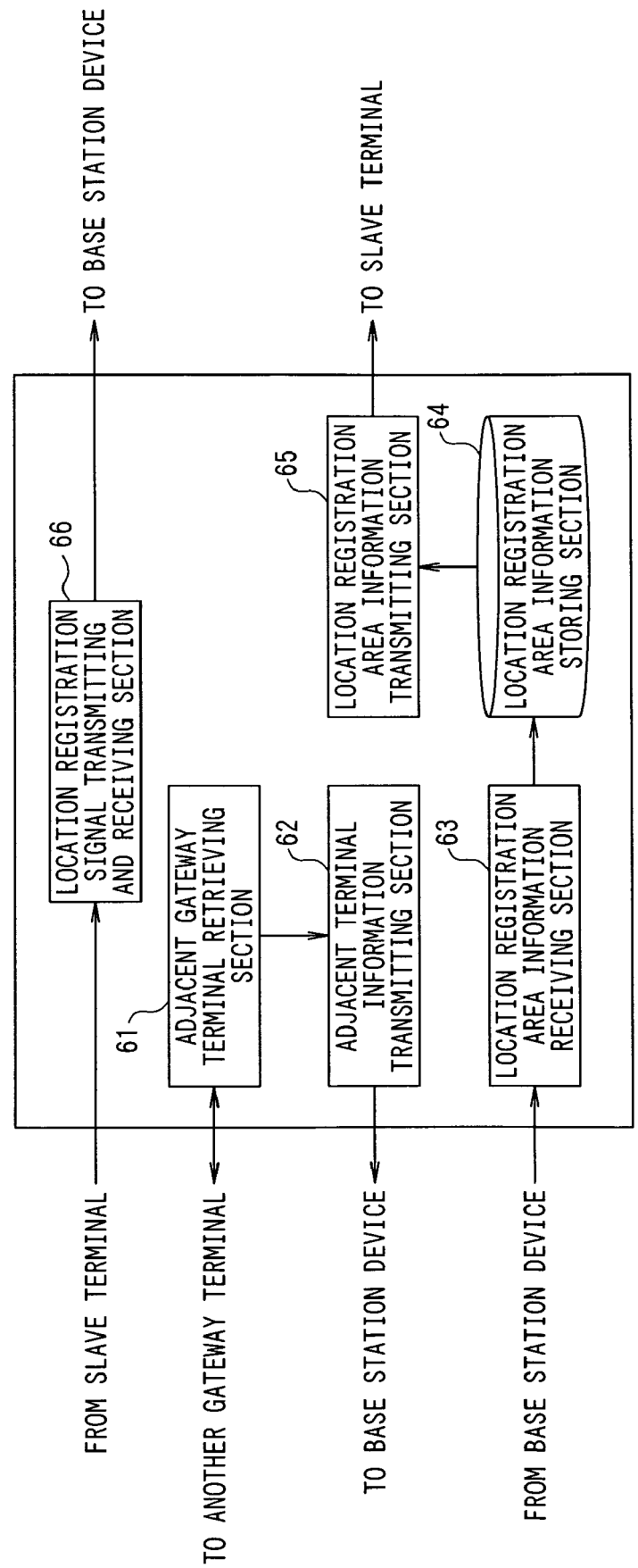
FIG. 13 is a diagram showing an example of the configuration of a gateway terminal in FIG. 4.
Figure 14:
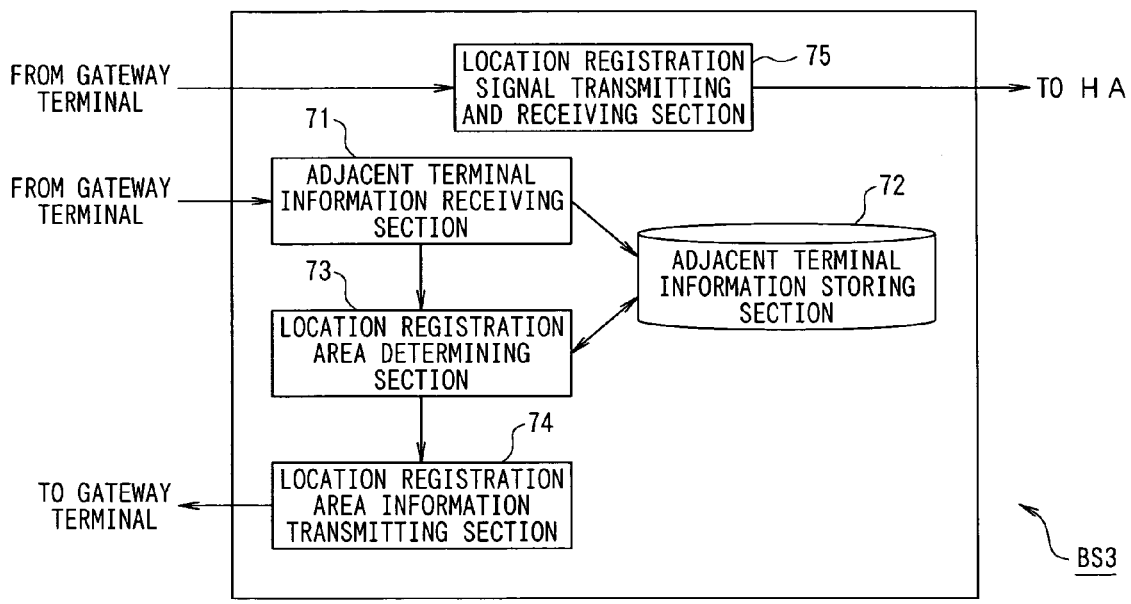
FIG. 14 is a diagram showing an example of the configuration of a base station device in FIG. 4.

With reference to FIGS. 13 and 14, description will be given of an example of the configuration of the gateway terminal and base station device which implements the above operations. The configuration of the slave terminal in FIG. 12 is similar to that in the first embodiment. Accordingly, its description is omitted.

(Example of Configuration of Gateway Terminal)

As shown in FIG. 13, a gateway terminal in a mobile communication system in accordance with the present embodiment includes an adjacent gateway terminal retrieving section 61 that outputs a retrieval message to retrieve another gateway terminal adjacent to the gateway terminal, an adjacent terminal information transmitting section 62 that transmits information on the gateway terminal (referred to as adjacent terminal information below) obtained by the adjacent gateway terminal retrieving section 61 to the base station device, a location registration area information receiving section 63 that receives the location registration area information transmitted by the base station device, a location registration area information storing section 64 that stores the location registration area information received by the location registration area information receiving section 63, a location registration area information transmitting section 65 that transmits the location registration area information stored in the location registration area information storing section 64, and a location registration signal transmitting and receiving section 66 that receives and transmits a location registration signal transmitted by the slave terminal to the base station device.

The other gateway terminals in FIG. 12 have a similar configuration.

(Example of Configuration of Base Station Device)

As shown in FIG. 14, a base station device BS3 in a mobile communication system in accordance with the present embodiment includes an adjacent terminal information receiving section 71 that receives adjacent terminal information transmitted by the gateway terminal, an adjacent terminal information storing section 72 that stores an adjacent terminal information table indicating each gateway terminal and the terminal adjacent to it, a location registration area determining section 73 which references the adjacent terminal information table stored in the adjacent terminal information storing section 72 to execute a grouping process and which then assigns a location registration area to each resulting group, a location registration area information transmitting section 74 that transmits, to the gateway terminal, location registration area information indicative of the location registration area assigned by the location registration area determining section 73, and a location registration signal transmitting and receiving section 75 that receives and transmits the location registration signal transmitted by the gateway terminal, to the HA 10.

(Operations of Whole System)

Figure 15:
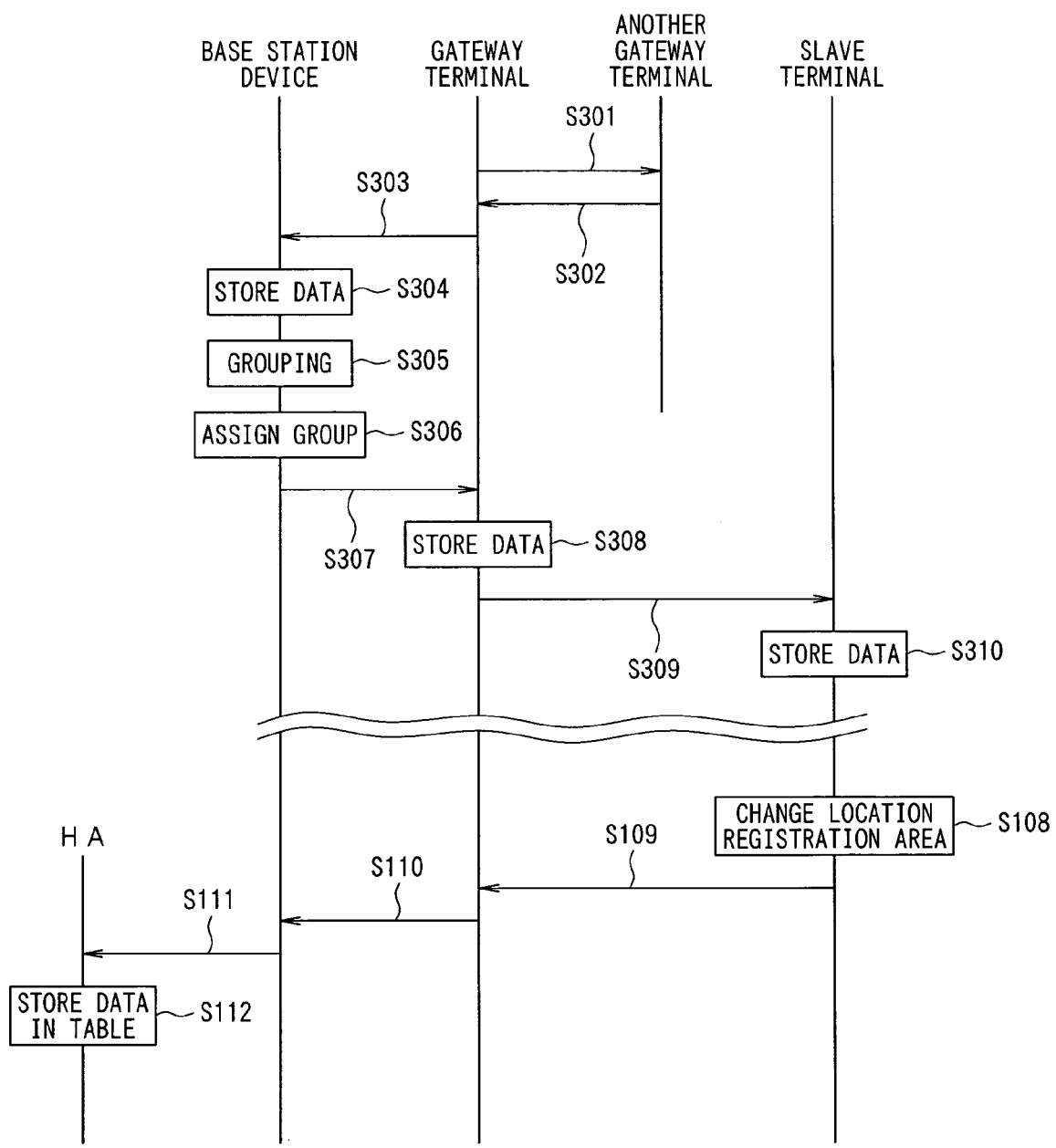
FIG. 15 is a sequence diagram showing operations of the mobile communication system in accordance with the third embodiment.

With reference to FIG. 15, description will be given of operations of the mobile communication system composed of the above gateway terminal, base station device, and the like.

In FIG. 15, the gateway terminal broadcasts a retrieval message to retrieve an adjacent gateway terminal (S301). Upon receiving the retrieval message, the other gateway terminal transmits a reply to the message (S302). Upon receiving the reply message, the first gateway terminal transmits the message to the base station device as a retrieval result (S303). Upon reception of the retrieval result, the base station device stores the result in the adjacent terminal information storing section (S304). The base station device references the contents stored in the adjacent terminal information storing section to group the gateway terminals (S305). The base station device then assigns a location registration area to each resulting group (S306). The base station device then transmits location registration area information indicative of the assigned location registration area to the gateway terminal (S307).

Upon receiving the location registration area information, the gateway terminal stores the information in the location registration area information storing section (S308). The location registration area information stored in the location registration area information storing section is transmitted to the slave terminal as required (S309). For example, the gateway terminal transmits the location registration area information stored in the location registration area information storing section to the slave terminal in response to a request from the slave terminal.

Alternatively, the gateway terminal may periodically (for example, at intervals of several tens of seconds to several minutes) broadcast the location registration area information regardless of whether or not the slave device makes a request. Alternatively, the gateway terminal may broadcast the location registration area information periodically and upon a request from the slave terminal.

Upon reception of the location registration area information transmitted by the gateway terminal, the slave terminal stores the information in the location registration area information storing section (S310).

The slave terminal compares the location registration area information stored in the location registration area information storing section with the received location registration area information. The slave terminal thus determines whether or not the location registration area has been changed.

Upon determining that the location registration area has been changed (S108), the slave terminal transmits a location registration signal to the gateway terminal (S109). The subsequent operations are similar to those in the first embodiment (S110 to S112). Accordingly, their description is omitted.

(Algorithm for Grouping)

The location registration area determining section 73 (see FIG. 14) groups the gateway terminals if the base station device receives, from the gateway terminals, the result of the retrieval of adjacent gateway terminals. An algorithm for the grouping process will be described with reference to FIG. 16. This figure is a flowchart showing the algorithm for grouping of the gateway terminals.

Figure 16:
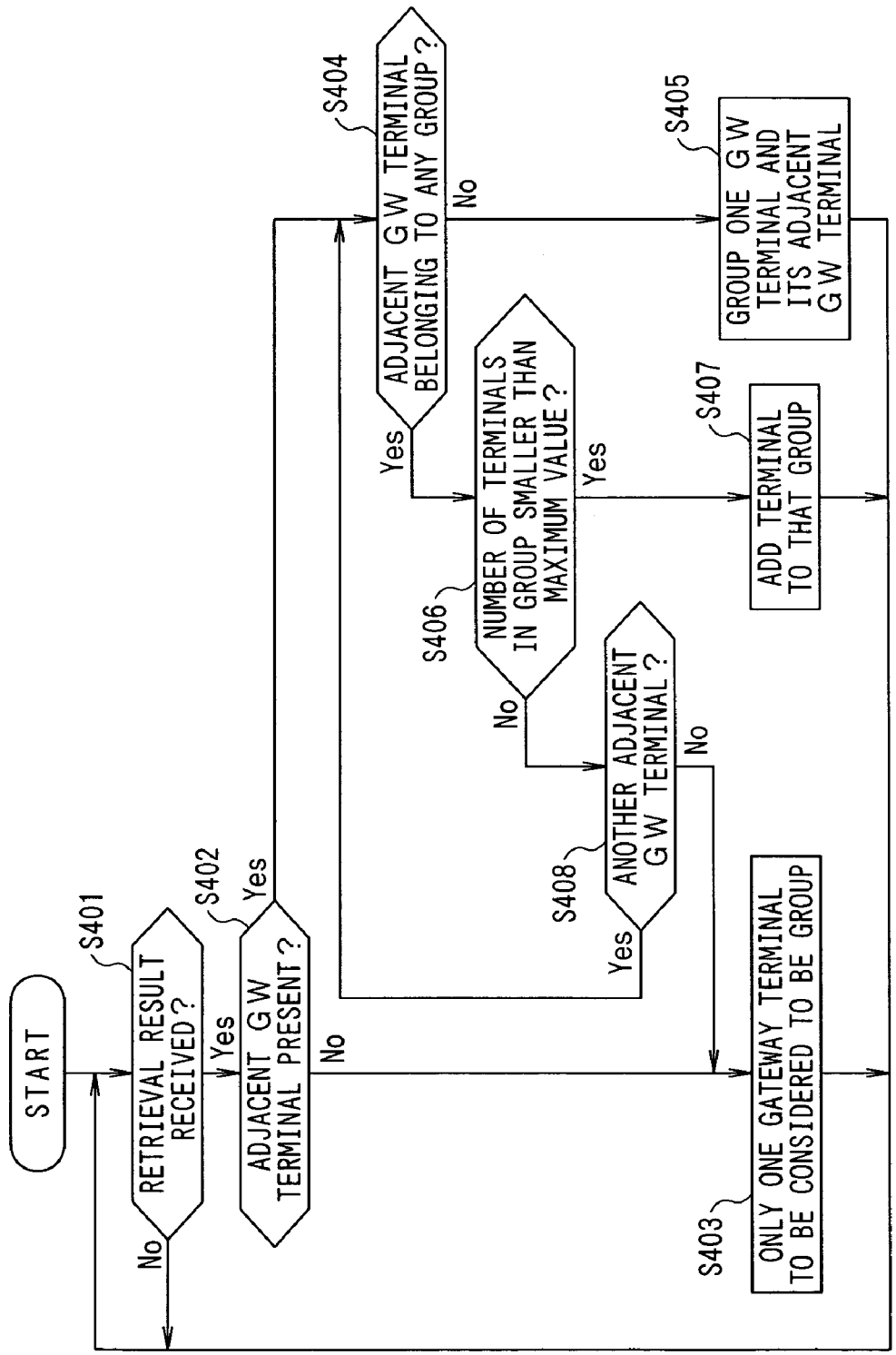
FIG. 16 is a flowchart showing an algorithm for a grouping process in accordance with the third embodiment.

In FIG. 16, the system determines whether or not the result of retrieval of an adjacent gateway terminal has been received (step S401). If the retrieval result has been received, the system determines whether or not an adjacent gateway terminal is present (step S401 to step S402). If the system determines that an adjacent gateway terminal is not present, only that gateway terminal is considered to be one group (step S402 to step S403). Subsequently, the process returns to step S401.

On the other hand, if the system determines in step S402 that an adjacent gateway terminal is present, then it determines whether or not the adjacent gateway terminal already belongs to any group (step S403 to step S404). If the system determines that the adjacent gateway terminal does not belong to any group, that gateway terminal and the adjacent gateway terminal are grouped (step S404 to step S405). Subsequently, the process returns to step S401.

If the system determines in step S404 that the adjacent gateway terminal already belongs to a certain group, then it determines whether or not the number of gateway terminals belonging to the group is smaller than the predetermined maximum number of gateway terminals (step S404 to step S406). If the system determines that the number of gateway terminals belonging to the group is smaller than the predetermined maximum number of gateway terminals, that gateway terminal is added to the group (step S406 to step S407). Subsequently, the process returns to step S401.

On the other hand, if the system determines in step S406 that the number of gateway terminals belonging to the group is at least the predetermined maximum number of gateway terminals, then it determines whether or not another adjacent gateway terminal is present (step S406 to step S408). If the system determines that another adjacent gateway terminal is present, the process returns to step S404 to determine whether or not that adjacent gateway terminal already belongs to any group. Then, the above process is repeated (step S408 to step S404 ... ).

If the system determines in step S408 that another adjacent gateway terminal is not present, only that gateway terminal is considered to be one group (step S408 to step S403). Subsequently, the process returns to step S401.

The above process allows the predetermined maximum number of gateway terminals for one location registration area to be grouped. One group thus forms a location registration area. In the above process, the adjacent terminal information table (FIG. 17) can be referenced to determine, for example, whether or not the gateway terminal already belong to any group or whether or not another adjacent gateway terminal is present.

(Example of Grouping Process)

Description will be given of an example of grouping based on the grouping process described above. In the present example, the maximum number of gateway terminals in one location registration area is "4".

A grouping process for gateway terminals Ga to Gj in FIG. 12 is executed in accordance with Procedures 1 to 7.

<Procedure 1>
The gateway terminal Ga is selected. The gateway terminals Ga and Gb are adjacent to each other. Thus, the gateway terminals Ga and Gb are grouped (location registration area A).

<Procedure 2>
The gateway terminal Gc is selected. The gateway terminals Gc and Gd are adjacent to each other. Thus, the gateway terminals Gc and Gd are grouped (location registration area B).

<Procedure 3>
The gateway terminal Ge is selected. The gateway terminals Gf and Gg are adjacent to the gateway terminal Ge. That is, the number of the terminals is three, less than four. Thus, the gateway terminals Ge, Gf, and Gg are grouped (location registration area C).

<Procedure 4>
The gateway terminal Gf is selected. The gateway terminals Ge and Gg are adjacent to the gateway terminal Gf. Accordingly, no processing is executed.

<Procedure 5>
The gateway terminal Gg is selected. The gateway terminals Gh and Gi are adjacent to the gateway terminal Gg. In this case, the gateway terminal Gi is selected, which has a smaller number of adjacent terminals. Then, the gateway terminals Ge, Gf, Gg, and Gi are grouped (location registration area C).

<Procedure 6>
The number of terminals belonging to the location registration area C becomes "4". Accordingly, the gateway terminal Gi is not selected but the gateway terminal Gh is selected. The gateway terminals Gg, Gi, and Gj are adjacent to the gateway terminal Gh. In this case, the gateway terminals Gg and Gi have already been grouped, so that the gateway terminal Gj is selected. Then, gateway terminals Gh and Gj are grouped (location registration area D).

<Procedure 7>
The gateway terminal Gj is selected. The gateway terminal Gk is adjacent to the gateway terminal Gj. Thus, the gateway terminals Gh, Gj, and Gk are grouped (location registration area D).

Figures 17, 18:
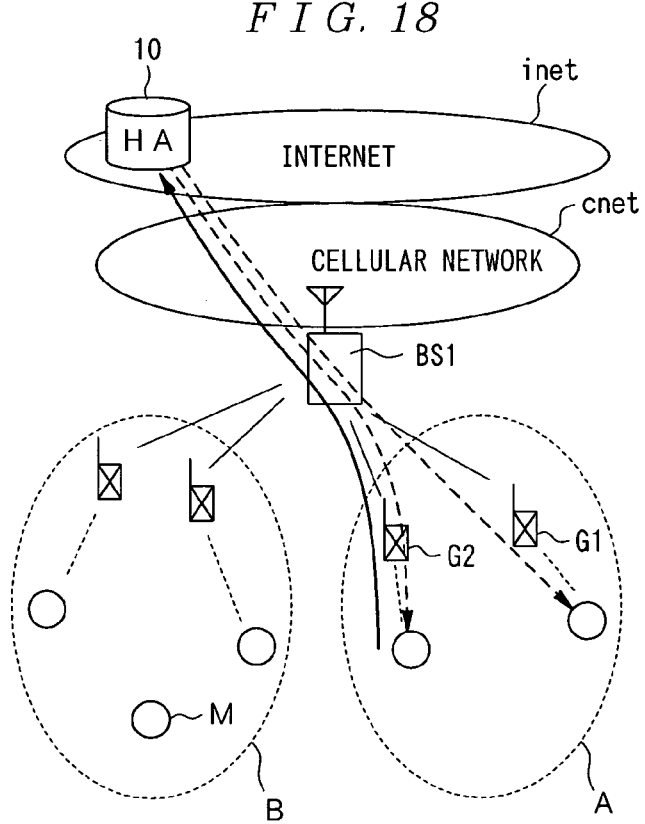
FIG. 17 is a diagram showing an example of an adjacent terminal information table.
FIG. 18 is a diagram showing an example in which gateway terminals are grouped so that one group corresponds to a location registration area.

As a result of the grouping process in accordance with Procedures 1 to 7, the adjacent terminal information table shown in FIG. 17 is stored in the adjacent terminal information storing section 72 (see FIG. 14). As seen in FIG. 17, for example, the "gateway terminal Gb" is adjacent to the "gateway terminal Ga". These gateway terminals form the location registration area "A". For the other gateway terminals, the adjacent terminal information storing section 72 (see FIG. 14) stores the correspondence between the location registration area information and the information on the gateway terminal and its adjacent terminal, as an adjacent terminal information table.

(Appropriate Size of Location Registration Area)

In the above embodiments, the gateway terminals are grouped so that one group corresponds to a location registration area, as shown in FIG. 18. Accordingly, even if the slave terminal is moved, if it can communicate with any gateway terminal within the same group, it does not transmit a location registration signal. If the mobile terminal M crosses location registration areas (the mobile terminal moves, for example, from the location registration area B to the location registration area information A), the mobile terminal M transmits a location registration signal (shown by a solid line arrow in the figure). Further, if there is an incoming message for the slave terminal, a paging operation is performed only on the gateway terminals belonging to the group constituting the location registration area for the slave terminal (as shown by a broken line arrow in the figure). The paging operation is not performed on the gateway terminals belonging to the other groups. This also makes it possible to reduce the number of paging signals required.

Figure 19:
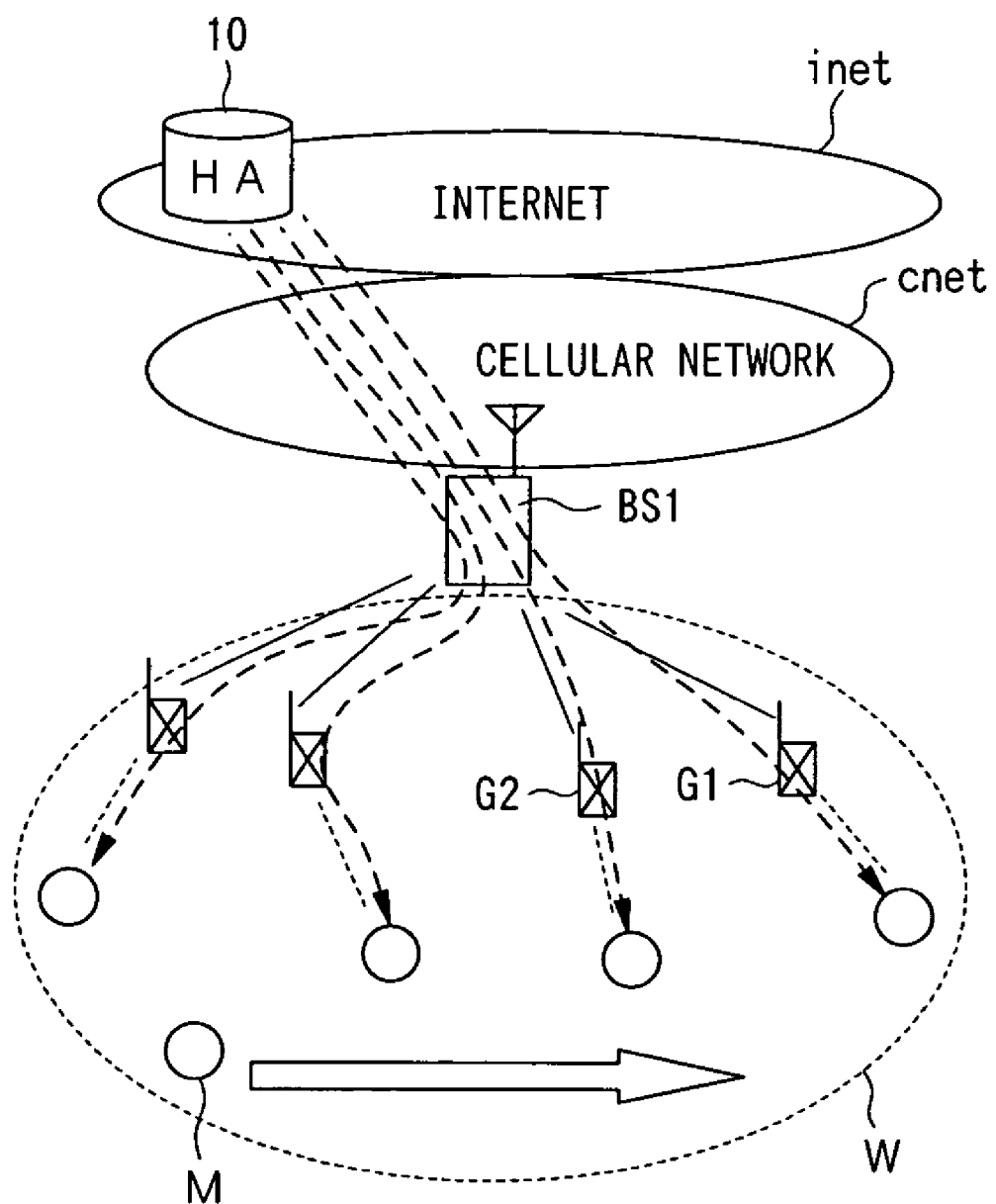
FIG. 19 is a diagram showing an example in which all the gateway terminals present within reach of an electric wave from the base station device correspond to one group.

One group may be composed of all the gateway terminals present within reach of an electric wave from the base station device as shown in FIG. 19. That is, in FIG. 18, the number of divisions N=4, whereas in FIG. 19, the number of divisions N=1. In this case, one location registration area W is obtained by combining the four location registration areas shown in FIG. 6A; one location registration area W corresponds to the entire reach of an electric wave from the base station device BS1. In this case, the location registration area correspondence table shown in FIG. 6C is used. That is, as shown in this figure, the location registration area is "W" if the latitude in the GPS information is between X1 and X4 and the longitude in the GPS information is between Y1 and Y4.

As shown in FIG. 19, if one group is composed of the gateway terminals present within reach of an electric wave from one base station device, the location registration area is large. Consequently, even if the slave terminal moves, the location registration signal is not transmitted provided that the slave terminal is present within that location registration area. This maximizes the effect of a reduction in the number of location registration signals. However, in this case, one base station device may accommodate an enormous number of mobile terminals. Then, if there is an incoming call for any mobile terminal, the paging operation is performed on all the mobile terminals mastered by the base station device (as shown by a broken line arrow in the figure). This increases the number of paging signals required. Description has been given of the case in which the number of divisions N=4 and the case in which the number of divisions N=1. However, the present invention is not limited to this. Another number of divisions may be used (provided that the number of divisions N is a natural number).

As described above, the following configuration is used instead of the one in which one group is composed of all the gateway terminals present within reach of an electric wave from the base station device: the gateway terminals are divided into a plurality of groups each corresponding to a location registration area as shown in FIG. 18. This makes it possible to appropriately balance the number of location registration signals with the number of paging signals.

(Variation for Acquisition of Geographical Locational Information)

In the above first and second embodiments, the gateway terminal acquires its own geographical locational information utilizing the well-known GPS. Alternatively, information acquired using the configuration described below may be utilized as geographical locational information.

(1) Utilization of Information Acquired Using Non-Contact Tags and Tag Readers

Non-contact tags are installed in facilities such as offices or at particular locations on the street. A tag reader provided in the gateway terminal utilizes information acquired from any of the non-contact tags.

Figure 20:
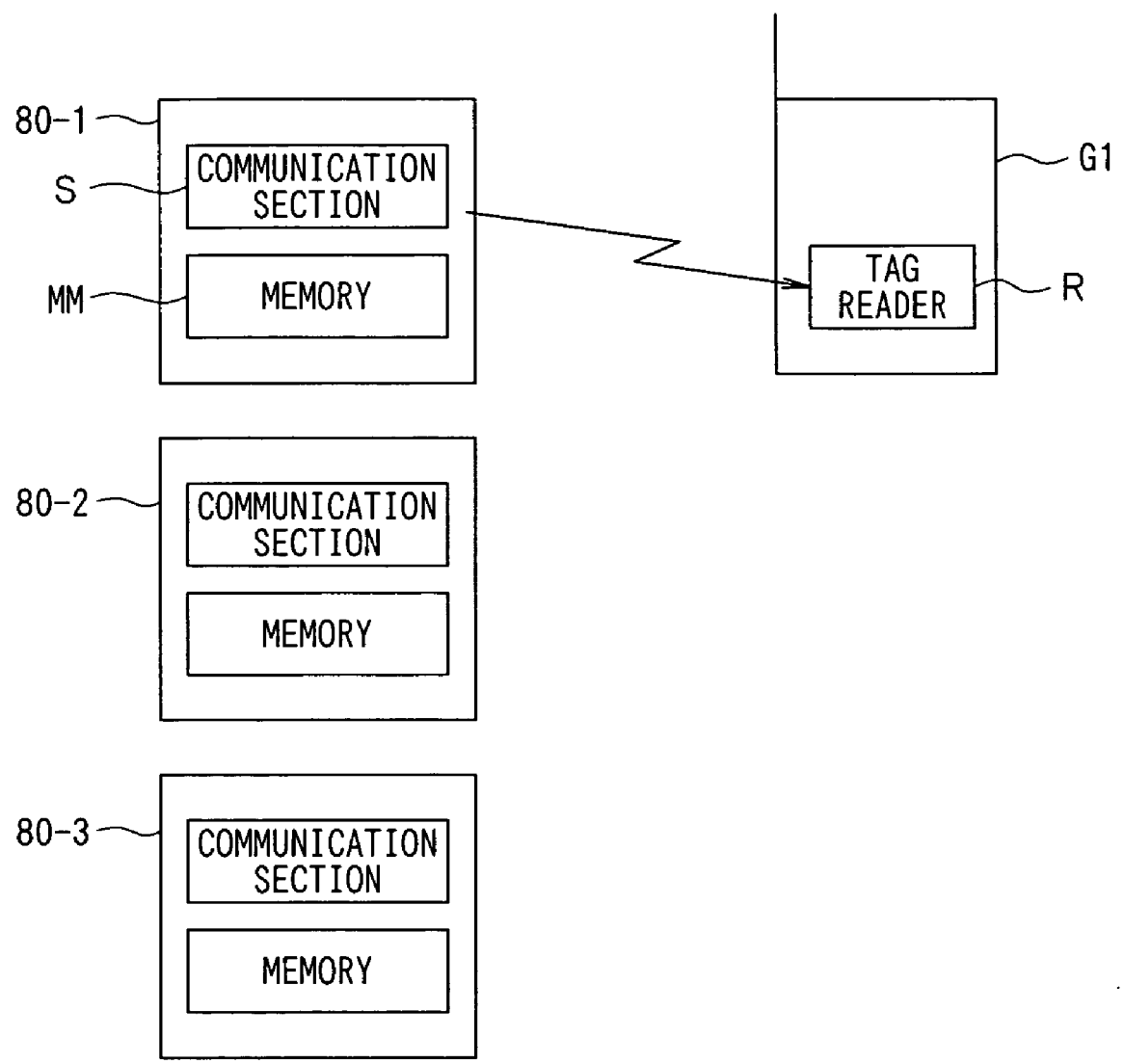
FIG. 20 is a diagram showing an example of a configuration that acquires information using non-contact tags and tag readers.

For example, as shown in FIG. 20, non-contact tags 80-1, 80-2, 80-3, . . . are installed in facilities such as offices or at particular locations on the street. Each of the non-contact tags includes a memory MM that stores unique tag ID information and a communication section S that transmits contents to be stored in the memory MM.

By operating a tag reader R in the gateway terminal G1, it is possible to acquire tag ID information from a non-contact tag 80-1. The unit-type tag reader R may be originally built into the gateway terminal G1 or may be separately provided and connected to the gateway terminal G1 using a connector. By utilizing the tag ID information acquired by the tag reader R as geographical locational information, it is possible to execute processing similar to that in the first and second embodiments.

If this configuration is applied to the first embodiment, the base station device is provided beforehand with a location registration area correspondence table relating to the correspondence between the tag ID information and the location registration area information. Then, the tag ID information acquired using the tag reader R is transmitted to the base station device. Then, with reference to the table, location registration area information can be acquired on the basis of the tag ID information. By transmitting the location registration area information from the base station device to the gateway terminal G1, it is possible to execute the subsequent processing as in the case of the first embodiment.

If the above configuration is applied to the second embodiment, the gateway terminal G1 receives, from the base station device, and stores the location registration area correspondence table relating to the correspondence between the tag ID information and the location registration area information. Accordingly, in this case, by utilizing the tag ID information acquired using the tag reader R, the gateway terminal G1 can acquire the location registration area information with reference to the table. The subsequent processing can be executed as in the case of the second embodiment.

Instead of the tag ID information, information identifying installation locations (for example, information indicative of the latitude and longitude of each installation location) is stored in the memory MM. Then, the gateway terminal G1 can acquire and utilize the information to execute processing as in the case of the first or second embodiment.

Figure 21:
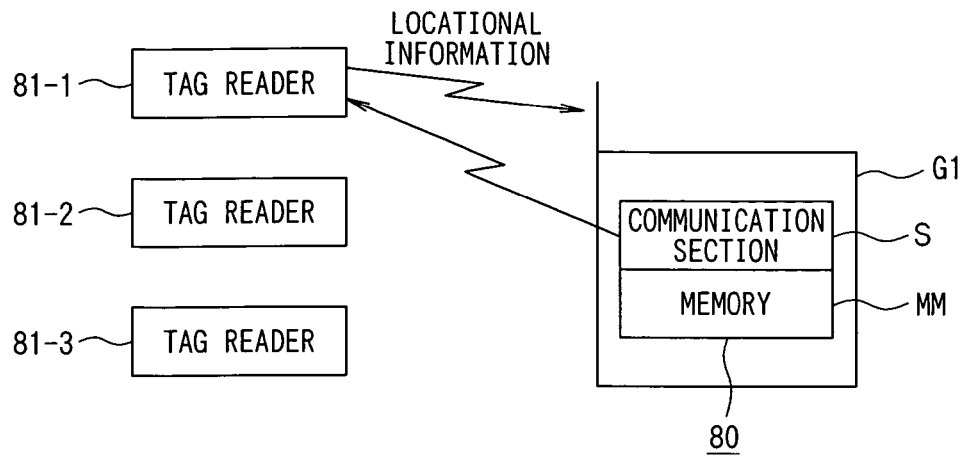
FIG. 21 is a diagram showing another example of a configuration that acquires information using non-contact tags and tag readers.

On the other hand, as shown in FIG. 21, tag readers 81-1, 81-2, 81-3, . . . may be installed in facilities such as offices or at particular locations on the street. Any of the tag readers 81-1, 81-2, 81-3, . . . may then utilize information obtained by reading a non-contact tag 80 added to the gateway terminal G1. In this case, when the for example, the tag reader 81-1 reads the non-contact tag 80 added to the gateway terminal G1, the communication section S transmits the tag ID information stored in the memory MM to the tag reader 81-1. Upon receiving the tag ID information, the tag reader 81-1 transmits information (indicative of, for example, the latitude and longitude of the installation location) identifying its own installation location. The gateway terminal G1 can acquire and utilize this information to execute processing as in the case of the first or second embodiment.

(2) Utilization of Information Acquired from Access Point for Radio LAN

Figure 22:
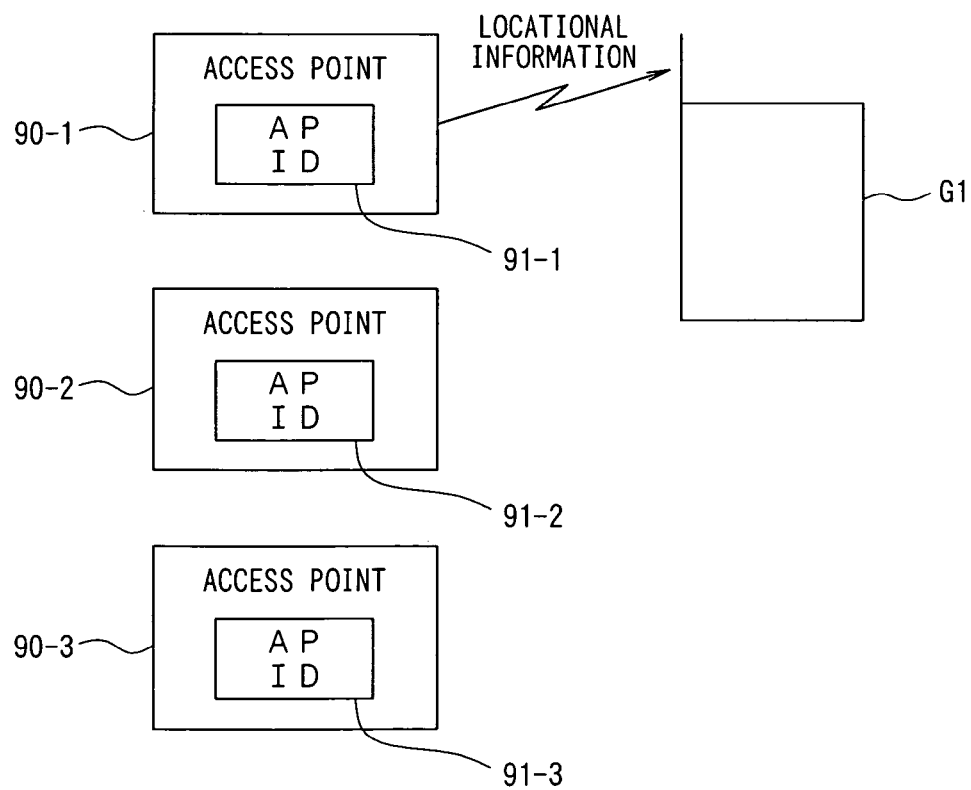
FIG. 22 is a diagram showing an example of a configuration that acquires information from access points for a radio LAN.

Access points for a radio LAN (Local Area Network) are provided in facilities such as offices or at particular locations on the street. Information is utilized which can be acquired by communicating with any of the access points. For example, access points 90-1, 90-2, 90-3, . . . for a radio LAN are provided as shown in FIG. 22. The access points 90-1, 90-2, 90-3, . . . are provided with unique APID information 91-1, 91-2, 91-3, . . . .

The gateway terminal G1 can wirelessly communicate with the closest of the access points 90-1, 90-2, 90-3, . . . . Here, the access point 90-1 is closest to the gateway terminal G1. When the gateway terminal G1 transmits a message to the access point 90-1, the access point 90-1 transmits a reply message. Upon receiving the reply message, the gateway terminal G1 can connect to the radio LAN. The mobile terminal mastered by the gateway terminal G1 can also connect to the radio LAN via the gateway terminal G1.

The reply message transmitted by the access point 90-1 contains APID information 91-1, which can be considered to be geographic locational information.

If this configuration is applied to the first embodiment, the base station device is provided beforehand with a location registration area correspondence table relating to the correspondence between the APID information and the location registration area information. Then, the APID information 91-1 acquired is transmitted to the base station device. Then, with reference to the table, location registration area information can be acquired on the basis of the APID information 91-1. By transmitting the location registration area information from the base station device to the gateway terminal G1, it is possible to execute the subsequent processing as in the case of the first embodiment.

If the above configuration is applied to the second embodiment, the gateway terminal G1 receives, from the base station device, and stores the location registration area correspondence table relating to the correspondence between the APID information and the location registration area information. Accordingly, in this case, by utilizing the APID information 91-1 contained in the reply message from the access point 90-1, the gateway terminal G1 can acquire the location registration area information with reference to the table. The subsequent processing can be executed as in the case of the second embodiment.

(Other Variations)

The base station device has been described as an example of the communication control device. However, the configuration of the base station device may be provided in a server device or any other communication control device provided in the core network. In this case, the gateway terminal acquires location registration area information (first and third embodiments) or location registration area correspondence information (second embodiment) from the server device or any other communication control device.

Further, the data communication has been described by way of example. However, for speech communication, the location registration area information may be stored in the HLR, which is a server storing, for example, information on the subscriber of each mobile device. That is, the terminal ID of the mobile terminal may be stored in the HLR in association with the location registration area information on the mobile terminal. When a message based on speech communication arrives, the contents stored in the HLR may be referenced. Even in this case, if there is an incoming message based on speech communication for any of the slave terminals, the incoming message is sent only to the relevant base station device and not to the other base station devices. The incoming message is sent to the relevant base station device, which then transmits this incoming message. Then, the gateway terminals within the location registration areas except the targeted one neglect the message. In contrast, the gateway terminals within the target location registration area transfer the message to their slave terminals. This makes it possible to reduce the number of location registration signals transmitted by the slave terminals of the gateway terminals.

(Method for Controlling Communication and Method for Controlling Terminal)

The control methods (1) to (5) described below are implemented in the mobile communication system described above.

(1) A method for controlling communication is implemented in a communication system in which each mobile terminal forms an ad hoc network together with a corresponding gateway terminal and in which if a location registration area is changed, the mobile terminal transmits a location registration signal, the method comprising a locational information acquiring step of acquiring a current location of the gateway terminal, a locational information transmitting step of transmitting the locational information acquired in the locational information acquiring step, a location registration area information acquiring step of acquiring location registration area information indicative of a location registration area of the gateway terminal on the basis of the locational information transmitted in the locational information transmitting step, and a location registration area information transmitting step of transmitting the location registration area information acquired in the location registration area information acquiring step, to the mobile terminal. This method for controlling communication corresponds to the communication system in accordance with the first embodiment. The number of location registration signals transmitted by the slave terminals can be reduced by acquiring the location registration area information corresponding to the information on the current location of the gateway terminal and transmitting the location registration area information acquired to the slave terminal.

(2) A method for controlling communication is implemented in a communication system in which each mobile terminal forms an ad hoc network together with a corresponding gateway terminal and in which if a location registration area is changed, the implemented method for controlling communication comprises a retrieving step of retrieving an adjacent gateway terminal, a grouping step of grouping the gateway terminal on the basis of a result of the retrieval in the retrieving step, and a location registration area information transmitting step of transmitting the group formed in the grouping step to the mobile terminal as location registration area information. This aspect of the method for controlling communication corresponds to the communication system in accordance with the third embodiment. By combining a plurality of gateway terminals into one group constituting one location registration area, it is possible to freely set the size of the location registration area and to reduce the number of location registration signals transmitted by slave terminals.

(3) A method for controlling a gateway terminal is implemented, the gateway terminal forming an ad hoc network together with a mobile terminal that transmits a location registration signal if a location registration area is changed, the method comprising a locational information acquiring step of acquiring information on a current location of the gateway terminal, a locational information transmitting step of transmitting the locational information acquired in the locational information acquiring step, a location registration area information receiving step of receiving location registration area information corresponding to the locational information transmitted in the locational information transmitting step, and a location registration area information transmitting step of transmitting the location registration area information received in the location registration information receiving step, to the mobile terminal. This method for controlling a terminal relates to the gateway terminal in accordance with the first embodiment. The number of location registration signals transmitted by slave terminals can be reduced by acquiring the location registration area information corresponding to the information on the current location of the gateway terminal and transmitting the location registration area information acquired to the slave terminal.

(4) A method for controlling a gateway terminal is implemented, the gateway terminal forming an ad hoc network together with a mobile terminal that transmits a location registration signal if a location registration area is changed, the method for controlling a gateway terminal comprises a retrieving step of retrieving an adjacent gateway terminal, an adjacent terminal information transmitting step of transmitting information on the adjacent terminal that is a result of the retrieval in the retrieving step, and a location registration area information transmitting step of transmitting a group of gateway terminals formed on the basis of the adjacent terminal information transmitted in the retrieval result transmitting step, to the mobile terminal as location registration area information. This aspect of the method for controlling communication corresponds to the gateway terminal in accordance with the third embodiment. By combining a plurality of gateway terminals into one group constituting one location registration area, it is possible to freely set the size of the location registration area and to reduce the number of location registration signals transmitted by slave terminals.

(5) A method for controlling a mobile terminal is implemented, the mobile terminal forming an ad hoc network together with a corresponding gateway terminal, the method comprising a location registration area information acquiring step of acquiring current location registration area information from a gateway terminal which forms an ad hoc terminal together with the mobile terminal and which belongs to a corresponding group, a comparing step of comparing the current location registration area information acquired from the location registration area information acquiring step with location registration area information stored in the mobile terminal, and a location registration signal transmitting step of transmitting a location registration signal only if the comparison in the comparing step does not show that contents of the location registration area information acquired from the location registration area information acquiring step match those of the location registration area information stored in the mobile terminal. This method for controlling a terminal relates to the mobile terminals in accordance with the first to third embodiments. The above control of the mobile terminal makes it possible to reduce the number of location registration signals transmitted.

CONCLUSION

The present invention acquires the information on the current location of the gateway terminal and groups a plurality of gateway terminals on the basis of the current location information acquired to obtain location registration areas. Then, the location registration area information indicative of the location registration area is transmitted to the slave mobile terminal. The slave mobile terminal transmits the location registration signal only if the location registration area information has been changed. This makes it possible to reduce the number of location registration signals transmitted by the slave terminals compared to the case in which the gateway terminals are not grouped.

The gateway terminals mastered by the same base station device are divided into a plurality of groups. A location registration area is formed for each group. This makes it possible to freely set the size of the location registration area. This enables the number of paging signals required to be reduced while decreasing the number of location registration signals transmitted by the mobile terminals.

The present invention can be utilized to reduce the number of location registration signals transmitted in a mobile network into which a core network and ad hoc networks are integrated.

What is claimed is:

1. A method for controlling communication in a communication system in which a mobile terminal forms an ad hoc network together with at least one gateway terminal, the method comprising:
   a retrieving step of retrieving an adjacent gateway terminal that is one of said at least one gateway terminal;
   a creating or updating step of creating or updating an adjacent terminal information table based upon information on said at least one gateway terminal and information on the adjacent gateway terminal;
   a grouping step of grouping the gateway terminals on the basis of a result of the retrieval in the retrieving step;
   a location registration area information transmitting step of transmitting the group formed in the grouping step to the mobile terminal as first location registration area information;
   a comparing step of comparing the first location registration area information transmitted to the mobile terminal with second location registration area information stored beforehand in the mobile terminal; a determination step of determining whether or not the first location registration area information has been changed from the second location registration area information; and
   a location registration signal transmitting step of transmitting a location registration signal only when the first location registration are information is determined to have been changed in the determination step;
   wherein the grouping step includes:
   a determining step of determining whether or not the adjacent gateway terminal is present;
   a determining step of determining, when the adjacent gateway terminal is present, whether or not the adjacent gateway terminal already belongs to a group;
   a determining step of determining, when the adjacent gateway terminal belongs to the group, whether or not the number of gateway terminals belonging to the group is smaller than a predetermined maximum number of the gateway terminals;
   an adding step of adding the adjacent gateway terminal to the group, when the number of gateway terminals belonging to the group is smaller than the predetermined maximum number; and
   a determining step of determining whether or not another adjacent gateway terminal is present, when the number of the gateway terminals belonging to the group is equal to or greater than the predetermined maximum number,
   wherein whether or not the adjacent gateway terminal already belongs to the group and whether or not said another adjacent gateway terminal is present are determined by referring to an adjacent terminal information table that includes a correspondence between location registration area information and information on the gateway terminal and the adjacent gateway terminal.

2. The method of claim 1, wherein only when the first location registration area information is determined to have been changed in the determination step is when the first location registration area information transmitted to the mobile terminal does not match the second location registration area information stored beforehand in the mobile terminal.

3. The method according to claim 1, wherein the ad hoc network is formed by the mobile terminal transmitting to the gateway terminal a search message to search for the gateway terminal around the mobile terminal or the gateway terminal periodically transmitting to the mobile terminal the search message.

4. The method according to claim 1,
   wherein a longitude and a latitude are associated with a location registration area in the location registration area correspondence table.

5. The method according to claim 1, wherein in the retrieving step, the adjacent gateway terminal is retrieved by broadcasting a retrieval message to retrieve the adjacent gateway terminal.

* * * * *

UNITED STATES PATENT AND TRADEMARK OFFICE
CERTIFICATE OF CORRECTION

PATENT NO. : 7,623,873 B2  Page 1 of 1
APPLICATION NO. : 11/245335
DATED : November 24, 2009
INVENTOR(S) : Satrusajang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this

Fourteenth Day of December, 2010

David J. Kappos
*Director of the United States Patent and Trademark Office*